United States Patent
Miyazaki et al.

(10) Patent No.: US 8,994,969 B2
(45) Date of Patent: Mar. 31, 2015

(54) MAINTENANCE METHOD AND APPARATUS FOR INFORMATION PROCESSING APPARATUS

(71) Applicants: Sou Miyazaki, Tokyo-to (KP); Reiji Murakami, Kanagawa-ken (JP); Yoshikatsu Kamisuwa, Tokyo-to (JP); Masaki Narahashi, Tokyo-to (JP)

(72) Inventors: Sou Miyazaki, Tokyo-to (KP); Reiji Murakami, Kanagawa-ken (JP); Yoshikatsu Kamisuwa, Tokyo-to (JP); Masaki Narahashi, Tokyo-to (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 175 days.

(21) Appl. No.: 13/719,931

(22) Filed: Dec. 19, 2012

(65) Prior Publication Data
US 2013/0238598 A1  Sep. 12, 2013

Related U.S. Application Data

(60) Provisional application No. 61/580,382, filed on Dec. 27, 2011.

(51) Int. Cl.
G06F 17/30 (2006.01)
G03G 15/00 (2006.01)
G06Q 10/00 (2012.01)

(52) U.S. Cl.
CPC ...... G06F 17/30554 (2013.01); G03G 15/5079 (2013.01); G06Q 10/20 (2013.01); G03G 2215/00109 (2013.01)
USPC ........................... 358/1.13; 358/1.1; 358/1.15

(58) Field of Classification Search
CPC . G06F 17/30; G06F 17/30554; G06F 3/1229; G06F 11/3055; G06F 11/321; G03G 15/5079; G03G 15/55; G03G 15/553; G06G 2215/00109; G06Q 10/20; H04N 1/00002; H04N 1/00031; H04N 1/00344; H04N 1/00053; H04N 1/00029
USPC ........................... 358/1.1, 1.9, 2.1, 1.13, 1.15
See application file for complete search history.

(56) References Cited

U.S. PATENT DOCUMENTS

| 2009/0147299 A1* | 6/2009 | Tetu | 358/1.15 |
|---|---|---|---|
| 2012/0173704 A1* | 7/2012 | Lingen | 709/224 |
| 2013/0070299 A1 | 3/2013 | Narahashi et al. | |
| 2013/0073908 A1 | 3/2013 | Miyazaki et al. | |

FOREIGN PATENT DOCUMENTS

JP  2001-034447  2/2001

* cited by examiner

*Primary Examiner* — Thomas D Lee
(74) *Attorney, Agent, or Firm* — Amin, Turocy & Watson, LLP

(57) ABSTRACT

In accordance with an embodiment, a maintenance method for an information processing apparatus comprises: acquiring a machine identification information for identifying the machine of the information processing apparatus and a machine information includes a setting value information of a plurality of setting items of a machine and an error information of the machine through an external storage apparatus, associating the acquired machine information with the machine identification information and storing the associated information in a database, acquiring a statistical image which is generated based on the setting value information of a plurality of information processing apparatuses, generating a setting value image determined by the setting value information of the machine based on the machine information stored in the database and combining the setting value image with the statistical image and displaying the combined image on a display unit.

9 Claims, 19 Drawing Sheets

FIG.4
T1 MACHINE IDENTIFICATION INFORMATION TABLE

| GLOBAL ID | LOCAL ID | SERIAL NUMBER | MODEL NAME |
|---|---|---|---|
| 001-0001 | 0001 | AB001 | Type A |
| 001-0002 | 0002 | AB002 | Type A |
| 100-0100 | 0003 | AA001 | Model A |
| 100-0101 | 0004 | AA002 | Model A |
| 100-0102 | 0005 | AC001 | Model A |
| 100-0103 | 0006 | AC002 | Model A |

FIG.5
T2 ERROR INFORMATION TABLE

| LOCAL ID | DRIVE TIME | PRINTED SHEET COUNT | OCCURRENCE TIMES OF JAM | ... |
|---|---|---|---|---|
| 0001 | 10000 | 100 | 3 | ... |

FIG.6
T3 DATABASE COLUMN-LOG DATA TITLE CORRESPONDENCE TABLE

| DB COLUMN NAME | LOG DATA TITLE |
|---|---|
| DRIVE TIME | EXECUTION TIME |
| DRIVE TIME | ACTUAL RUNNING TIME |
| PRINTED SHEET COUNT | PRINTED SHEET COUNT |
| PRINTED SHEET COUNT | PRINTING COUNTER |

FIG.7
T4 SETTING VALUE INFORMATION TABLE

| LOCAL ID | SETTING ITEM | SETTING VALUE | MAXIMUM VALUE | MINIMUM VALUE |
|---|---|---|---|---|
| 0001 | VOLTAGE A | 6 | 10 | 1 |
| 0001 | VOLTAGE B | 8 | 10 | 1 |
| 0001 | VOLTAGE C | 3 | 5 | 1 |

FIG.8
T5 SETTING ITEM-STATISTICAL GRAPH PATTERN CORRESPONDENCE TABLE

| MODEL NAME | SETTING ITEM | STATISTICAL GRAPH PATTERN |
|---|---|---|
| Type A | VOLTAGE A | 3 |
| Type A | VOLTAGE B | 2 |
| Type A | VOLTAGE C | 1 |

FIG.9
T6 STATISTICAL GRAPH PATTERN-GRAPH IMAGE CORRESPONDENCE TABLE

| STATISTICAL GRAPH PATTERN | NAME OF PATTERN IMAGE |
|---|---|
| 1 | Pattern_1.png. |
| 2 | Pattern_2.png. |
| 3 | Pattern_3.png. |

FIG.10

T7 SETTING ITEM LIST

| TYPE | SETTING ITEM NAME | TYPE | SETTING ITEM NAME |
|---|---|---|---|
| PROCESS | CHARGED GRID BIAS ADJUSTMENT | SCANNER | PRIMARY SCANNING SHIFT OF CCD |
| PROCESS | HIGH-VOLTAGE MANUAL ADJUSTMENT CHARGED | .... | .... |
| .... | .... | PRINTER | FINE ADJUSTMENT ON ROTATION OF POLYGON MOTOR |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | .... | .... |
| .... | .... | SYSTEM | DEFAULT SETTING VALUE OF BLANK PAPER DETERMINATION ADJUSTMENT THRESHOLD WHEN POWER SUPPLY IS SWITCHED ON |

FIG.28
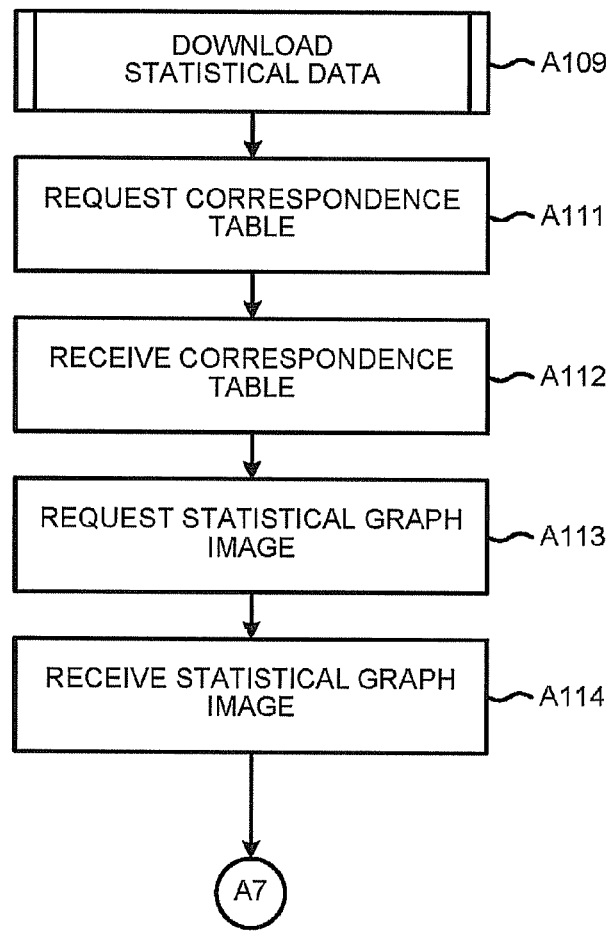
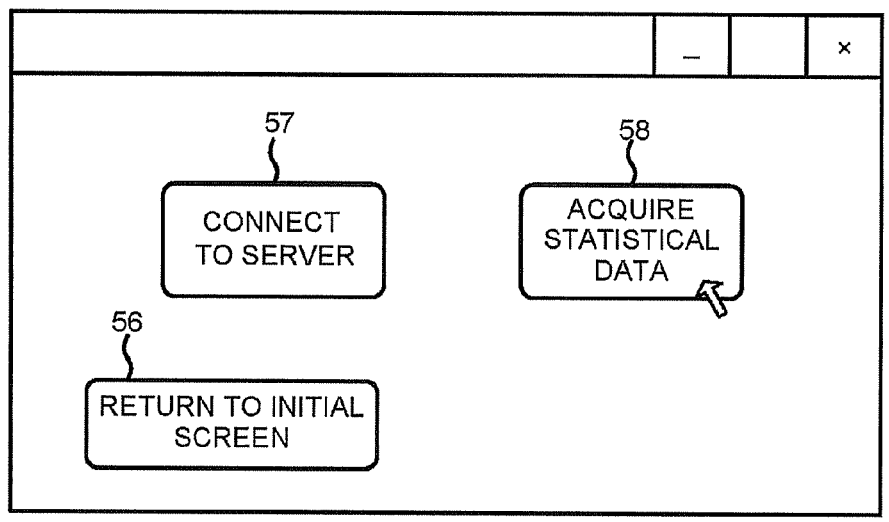

US 8,994,969 B2

MAINTENANCE METHOD AND APPARATUS FOR INFORMATION PROCESSING APPARATUS

CROSS-REFERENCE TO RELATED APPLICATIONS

This application is based upon and claims the benefit of priority from U.S. Provisional Application No. 61/580,382 filed on Dec. 27, 2011; the entire contents of which are incorporated herein by reference.

FIELD

Embodiments described herein relate to a maintenance method and a maintenance apparatus for analyzing an image forming apparatus or an information processing apparatus such as a POS (point of sales) terminal in an offline manner.

BACKGROUND

Conventionally, an image forming apparatus such as an electrophotographic copier forms an image on a paper through a cyclic process involving charging, exposure, development, transfer and fixing. Moreover, the image forming apparatus is maintained by a service person, who is ingenerated of an abnormality in the image forming apparatus by the user by telephone when the abnormality occurs and then goes to the place where the apparatus is installed to confirm the condition. Moreover, each service person takes charge of the maintenance of a plurality of image forming apparatuses.

In the case where a plurality of image forming apparatuses are maintained, in order to acquire various data of each image forming apparatus so as to get statistical information, the following method is provided according to which each image forming apparatus is connected with a network, the data of the image forming apparatus is sent to a server connected with the network, and the information statistically calculated in the server is browsed using a browser.

However, the image forming apparatus and the apparatus for information browse must be connected with the network. Moreover, there are still a great many offline (not connected with a communication line such as the Internet) machines on the market functioning as image forming apparatuses to be maintained. In addition, there are also plenty of machines (referred hereinafter to as machine in offline state for the sake of convenience) which provide no machine information for the reason of security even they can be connected with a communication line such as the Internet.

Thus, a method is expected by which the machine information of a machine in offline state can be collected and a proper analysis processing can be performed based on the machine information collected to maintain an image forming apparatus. Moreover, the method is also expected to provide the same maintenance on various offline information processing apparatuses in addition to image forming apparatuses.

BRIEF DESCRIPTION OF THE DRAWINGS

FIG. 4 is a diagram illustrating an example of the machine identification information table T1 of a maintenance apparatus according to the embodiment;

FIG. 5 is a diagram illustrating an example of the error information table T2 of the maintenance apparatus;

FIG. 6 is a diagram illustrating the database column name-log data title in correspondence with table T3 of the maintenance apparatus;

FIG. 7 is a diagram illustrating an example of the setting value information table T4 of the maintenance apparatus;

FIG. 8 is a diagram illustrating an example of the setting item-statistical graph pattern correspondence table T5 of the maintenance apparatus;

FIG. 9 is a diagram illustrating an example of the statistical graph pattern-graph image correspondence table T6 of the maintenance apparatus;

FIG. 10 is a diagram illustrating an example of the setting item list T7 of an image forming apparatus taking the maintenance apparatus as an evaluated object;

FIG. 28 is a flowchart illustrating the statistical data download actions of the maintenance apparatus.

DETAILED DESCRIPTION

In accordance with an embodiment, a maintenance method for an information processing apparatus comprises: acquiring a machine identification information for identifying the machine of the information processing apparatus and a machine information includes a setting value information of a plurality of setting items of a machine and an error information of the machine through an external storage apparatus, associating the acquired machine information with the machine identification information and storing the associated information in a database, acquiring a statistical image which is generated based on the setting value information of a plurality of information processing apparatuses, generating a setting value image determined by the setting value information of the machine based on the machine information stored in the database and combining the setting value image with the statistical image and displaying the combined image on a display unit.

Embodiment 1

Figure 1:
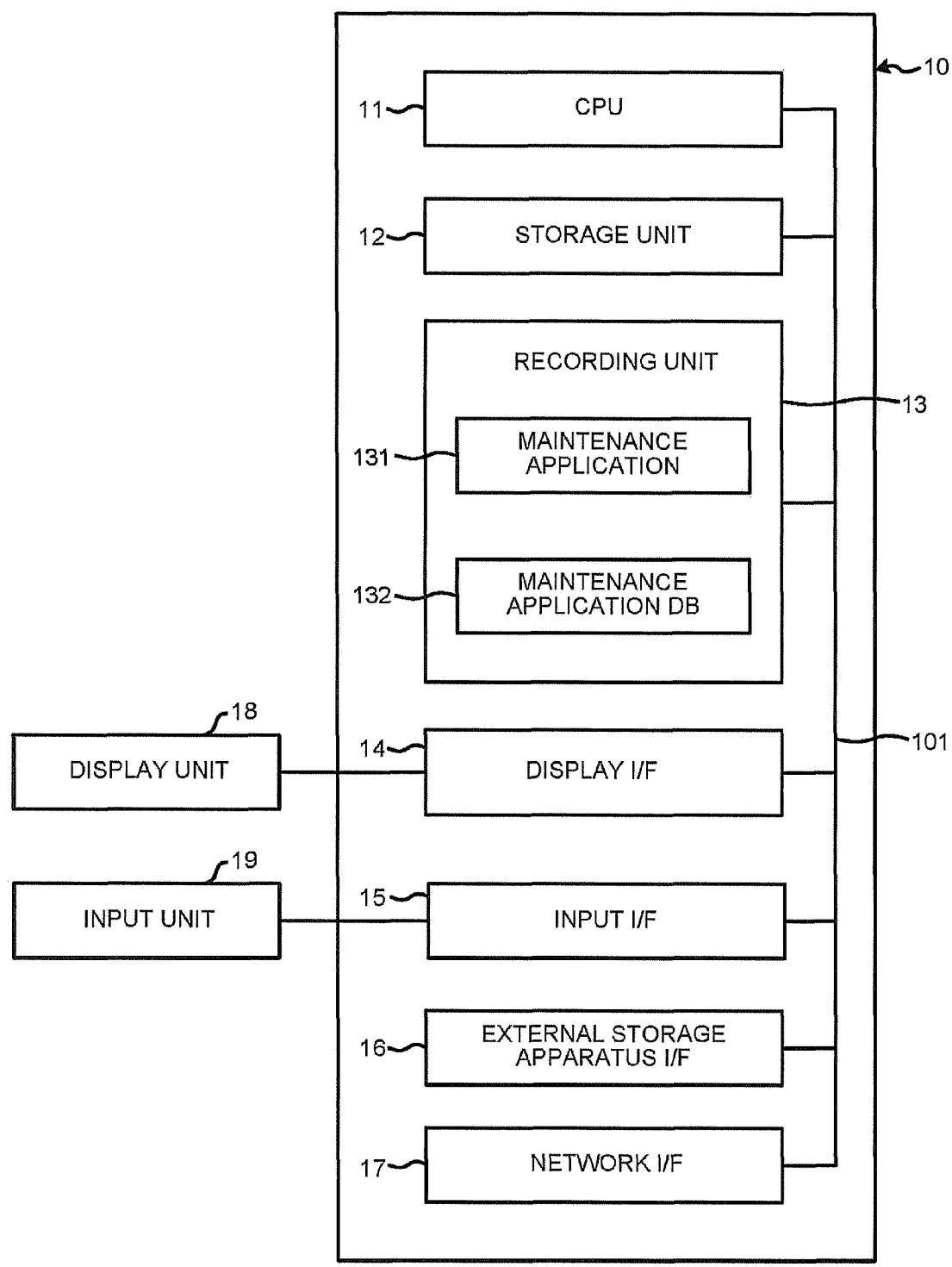
FIG. 1 is a block diagram illustrating an example of the structure of a maintenance apparatus according to an embodiment.

FIG. 1 is a block diagram illustrating an example of the structure of a maintenance apparatus 10 according to embodiment 1. As shown in FIG. 1, the maintenance apparatus 10 comprises: a processing unit 11 such as a CPU, a storage unit 12 such as a memory, a recording unit 13 such as an HDD, a display interface (I/F) 14, an input interface (I/F) 15, an external storage apparatus interface (I/F) 16 and a network interface (I/F) 17. Further, the processing unit 11, the storage unit 12, the recording unit 13, the display I/F 14, the input I/F 15, the external storage apparatus I/F 16 and the network I/F 17 are connected with each other through a bus line 101.

The display I/F 14 is connected with a display unit 18 such as a liquid crystal display so as to provide image information to the display unit 18. The input I/F 15 is connected with an input unit 19 including a mouse and a keyboard to send an instruction input through the input unit 19 to the processing unit 11. The external storage apparatus I/F 16 is an interface for a connection with a pluggable external storage medium (e.g. USB (Universal Serial Bus)) serving as an external storage apparatus. Further, the network I/F 17 is an interface for communication with a network such as the Internet.

Figure 2:
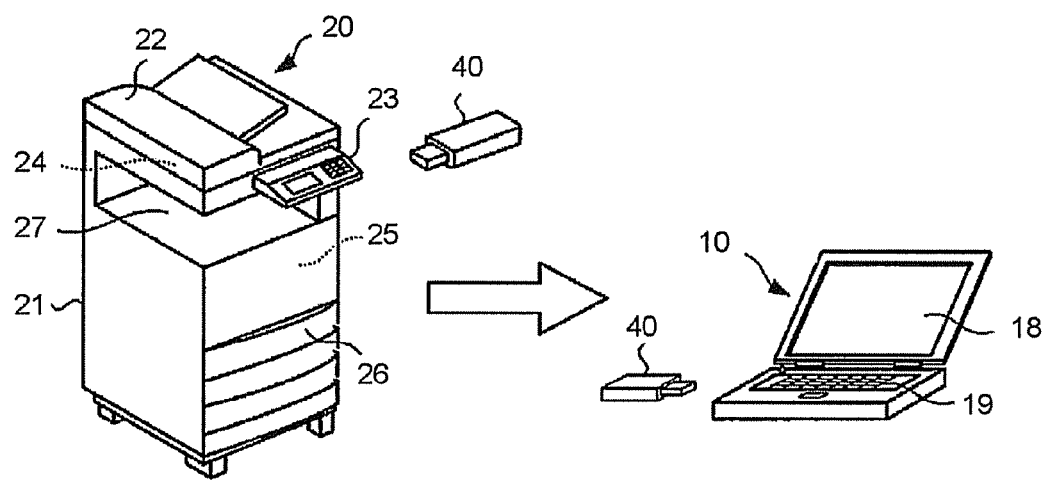
FIG. 2 is an external view illustrating the relationship between an image forming apparatus and a maintenance apparatus according to the embodiment.

Further, as it is premised that the maintenance apparatus 10 is carried by a service person to the place where an image forming apparatus is installed, the maintenance apparatus 10 is preferably in a form portable to the service person, for example, in a form equivalent to the personal notebook computer shown in FIG. 2.

Moreover, it is assumed in embodiment 1 that the setting information of an image forming apparatus 20 is provided to the maintenance apparatus 10 by a pluggable external storage medium such as a USB memory 40 in an offline manner, as shown in FIG. 2, but not through a network in an online manner.

That is, there are still many offline states (the state that is not connected with a communication line such as the Internet) for information processing apparatuses such as image forming apparatuses, additionally, the connection with a communication line such as the Internet leads to some security problems, thus, it is considered to use a great number of machines without providing any machine information.

In addition, the image forming apparatus 20 is hereinafter described as an example of an information processing apparatus; however, a POS (Point Of Sales) terminal can also be described as an example of an information processing apparatus. Furthermore, a compound machine, that is an MFP, is described as an example of the image forming apparatus 20; however, the image forming apparatus 20 may be other image forming apparatus such as a copier, a printer, a scanner, a fax machine and so on.

FIG. 2 is an external view illustrating the relationship between an MFP (image forming apparatus) 20 and the maintenance apparatus 10. An original table, on which an automatic document feeding unit (ADF) 22 is arranged in an openable/closable manner, is arranged on the upper portion of the main body 21 of the MFP 20. Further, an operation unit 23 is arranged on the upper portion of the main body 21. Various operational keys and a touch panel type display unit are contained in the operation unit 23.

Further, a scanner unit 24 is arranged under the ADF 22 inside the main body 21. The scanner unit 24 reads the original fed by the ADF 22 or placed on the original table to generate image data. A printer unit 25 is arranged in the internal center of the main body 21, and a plurality of paper cassettes 26 for accommodating papers of different sizes are arranged on a lower portion of the main body 25.

The printer unit 25 includes a photosensitive drum and laser to process the image data read by the scanner unit 24 and the image data generated by a PC (Personal Computer) to form an image on a paper and fix the image. The paper on which an image is fixed by the printer unit 25 is discharged to a paper discharging unit 27.

Further, a port for connecting, in a pluggable way, a USB memory 40 serving as an external storage apparatus is arranged on one lateral surface of the main body 21 of the MFP 20. The USB memory 40 acquires the machine information of the MFP 20 and other information through the port connected with the MFP 20 and then stores the acquired information therein.

Further, the maintenance apparatus 10 is also provided with a port for connecting the USB memory 40 so as to acquire the information stored in the USB memory 40, such as the machine information of the MFP 20, through the external storage apparatus I/F 16. Thus, the external storage apparatus I/F 16 constitutes a machine information acquisition unit.

Figure 3:
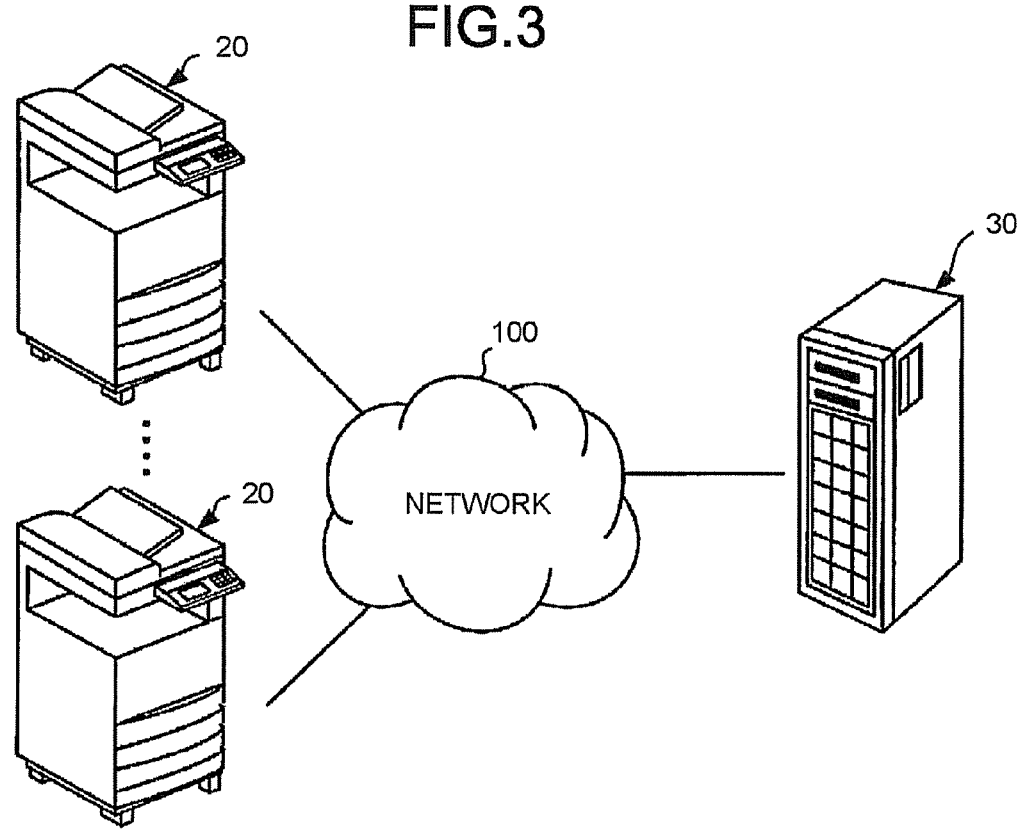
FIG. 3 is a diagram illustrating the relationship between an image forming apparatus and a server according to the embodiment.

FIG. 3 is a diagram illustrating the relationship between the MFP (image forming apparatus) 20 and a server 30. As shown in FIG. 3, one or more MFPs 20 are connected with a network 100 in which a server 30 carrying out information analysis and the like. When the MFP 20 is connected with the network 100, the server 30 collects and stores the setting value of the MFP 20 automatically and updates statistical data in the server 30.

Moreover, a maintenance application 131 (hereinafter referred to as application) for the image forming apparatus and a database 132 (hereinafter referred to as database) used by the application are stored in the recording unit 13 of the maintenance apparatus 10 described in embodiment 1. The statistical graph image (described later) stored in the server 30 can be downloaded into and stored in the database 132.

The database 132 consists of the following tables (a)-(g):
(a) machine identification information table T1 (FIG. 4)
(b) error information table T2 (FIG. 5)
(c) database column name-log data title correspondence table T3 (FIG. 6)
(d) setting value information table T4 (FIG. 7)
(e) setting item-statistical graph pattern correspondence table T5 (FIG. 8)
(f) statistical graph pattern-graph image correspondence table T6 (FIG. 9)
(g) setting item list T7 (FIG. 10)

Additionally, the mentioned 'machine' refers to the image forming apparatus 20, which includes printer, scanner, fax machine and so on.

As shown in FIG. 4, machine identification information table T1 includes a 'global ID' column, a 'local ID' column, a 'serial number' column and a 'model name' column for the image forming apparatus 20. That is, the machine identification information table T1 is a table containing the identification information of a machine, which contains a global ID serving as a unique identification number assigned to each machine by the server 30, a local ID serving as a sorting number used in machine identification information table T1, a serial number serving as a unique identification number endowed to each machine by the maker of the machine, and the model name of a specific type of machines.

The global ID is a number or a string which is assigned by the server to a machine when the fixed number (serial number) assigned by the maker of the machine to the machine is not fully reliable in the case where the machines of different makers are managed uniformly. Thus, in order to narrow the range of machines to be 1, a global ID is released based on a plurality of necessary items. A specific example of the global ID is, for example, a maker name+a serial number or a model name+a serial number.

As shown in FIG. 5, error information table T2 includes a 'local ID' column, a 'drive time' column, a 'printed sheet count' column and a 'Occurrence times of Jam' column for the image forming apparatus 20. That is, error information table T2 contains a local ID serving as a sorting number in machine identification table T1, a drive time serving as a machine driving time, printed sheet count indicating the total number of the sheets printed by the machine or the number of the sheets printed in one day, and the Occurrence times of Jam of the paper in the machine.

As shown in FIG. 6, database column name-log data title correspondence table T3 includes a 'database (DB) column name' and a 'log data title' column. That is, the database column name-log data title correspondence table is a correspondence table in which the name of error information changes with the model or maker of the machine. For example, the drive time corresponds to and execution time or an actual running time, and printed sheet count corresponds to the number of the sheets printed or a printing counter As shown in FIG. 7, setting value information table T4 includes a 'local ID' column, a 'setting item' column, a 'setting value' column, a 'maximum value' column and a 'minimum value' column. That is, setting value information table T4 contains a local ID serving as a sorting number in the machine setting list T4, setting items of the image forming apparatus serving as an evaluated object, the setting value of a setting item, and the maximum value and the minimum value of a setting value.

As shown in FIG. 8, setting item-statistical graph pattern correspondence table T5 includes a 'model name' column, a 'setting item' column and a 'statistical graph pattern' column.

As shown in FIG. 9, statistical graph pattern-graph image correspondence table T6 includes a 'statistical graph pattern' column and a 'graph image name' column.

As shown in FIG. 10, setting item list T7, which is a list of the setting items of the image forming apparatus 20 serving as an evaluated object, includes process-related setting items, scanner-related setting items, printer-related setting items and system-related setting items.

Setting items are exemplarily shown in FIG. 10, however, process-related setting items include: charged grid bias adjustment, high-voltage manual adjustment Charged, high-voltage manual adjustment Color development, high-voltage manual adjustment Primary transfer constant voltage, high-voltage manual adjustment Secondary transfer constant voltage, high-voltage manual adjustment Anti-static blade, high-voltage manual adjustment Secondary transfer constant current, charged grid correction voltage value, developing bias correction voltage value, the quantity of laser power correction light, standard D/A value of laser power correction light, output of VO sensor, output of potential sensor when shutter of VO sensor is closed, adjustment on laser power output, execution value of primary transfer bias in standard mode, primary transfer resistance detection offset, execution value of front/rear end bias in primary transfer, front-rear end bias correction coefficient in primary transfer, execution value of secondary transfer bias color, execution value of secondary transfer monochrome, paper surface bias offset, paper surface secondary front-rear end bias correction coefficient, primary transfer constant current trans-adjustment value, primary transfer constant voltage trans-adjustment value, secondary transfer constant current trans-adjustment value, secondary transfer constant voltage trans-adjustment value, anti-static bias adjustment value, high-voltage manual adjustment Anti-static blade (high), high-voltage manual adjustment Primary transfer constant current, fixing temperature (heat roller), forced ON time of heater, fixing temperature (press roller), pre-running time of 1st printing, set fixing temperature at the beginning of an abnormality processing, threshold value of sheets when heater is forcedly on, ready permissive temperature range, ready pre run fixing motor deceleration, pre-running time in ready state, fixing temperature for ready, temperature drop switching time in ready state, permissive temperature range at the beginning of printing process, set temperature keeping time for printing action at the end of printing process, lower limit of fixing controlling temperature, printing temperature drop switching time, correction on permissive temperature when preheating restores, set on time limitation when sleeping/preheating restores, printing speed switching temperature, lower limit of power change, magnitude of power change, magnitude of lower limit keeping temperature at power drop, preheating time, controlling temperature keeping time when sleeping restores, fixing temperature transfer time during preheating process and increase in fixing temperature for preheating transfer.

Further, scanner-related setting items include: primary scanning offset of CCD, secondary scanning offset of scanner, secondary scanning magnification of scanner, distortion, shading position adjustment, aligning quantity of ADF, fine adjustment on conveying speed of ADF, translation of ADF, adjustment on position of front end of ADF, adjustment on position of carriage during reading process of ADF.

Printer-related setting items include: fine adjustment on rotation of polygon motor, outgoing position of laser, fine adjustment on speed of conveying motor of ADU, adjustment on translation of cassette, adjustment on translation of ADU, top margin, left margin, right margin, bottom margin, top margin, left margin, right margin, bottom margin, front end position adjustment CST 1 adjustment value, front end position adjustment CST 2 adjustment value, front end position adjustment CST 3 adjustment value, front end position adjustment CST 4 adjustment value, front end position adjustment Manually inserted paper adjustment value, front end position adjustment ADU adjustment value, front end position adjustment TLCF adjustment value, front end position adjustment OLCF adjustment value, first cassette Aligning quantity, second cassette Aligning quantity, aligning quantity of fed manually-inserted paper, third cassette Aligning quantity, fourth cassette Aligning quantity, aligning quantity of paper fed by ADU, aligning quantity of paper fed by LCF in column, adjustment on press quantity after paper is manually inserted, fine adjustment on speed of drum motor, fine adjustment on speed of light-resisting motor, fine adjustment on speed of motor of transfer belt, fine adjustment on speed of heating roller, fine adjustment on speed of paper feeding motor, fine adjustment on speed of fixing and paper discharging motor, bias/offset adjustment value, stop time of polygon motor, set times for retry of paper feeding, manual staple timeout time and specified interruption time (s) in continuous printing for position alignment.

Moreover, system-related setting items include the default setting value of a blank paper determination adjustment threshold when power supply is switched on.

In embodiment 1, the data recorded in the database 132 is only described exemplarily but not actually limited to this example. Moreover, the database 132 may contain one or more tables (based on related data and model), or the database is replaced by a CSV (Comma Separated Value) file.

In the server 30, a plurality of image forming apparatuses 10 connected with the network 100 are managed in a database form, and the image forming apparatuses under the management of the server 30, can be uniquely determined without regard to our company's products or third-party products by setting a serial number and a model name as primary keywords. Further, in addition to the combination of a serial number and a model name, a combination of a serial number and a maker name is also applicable.

Figure 11:
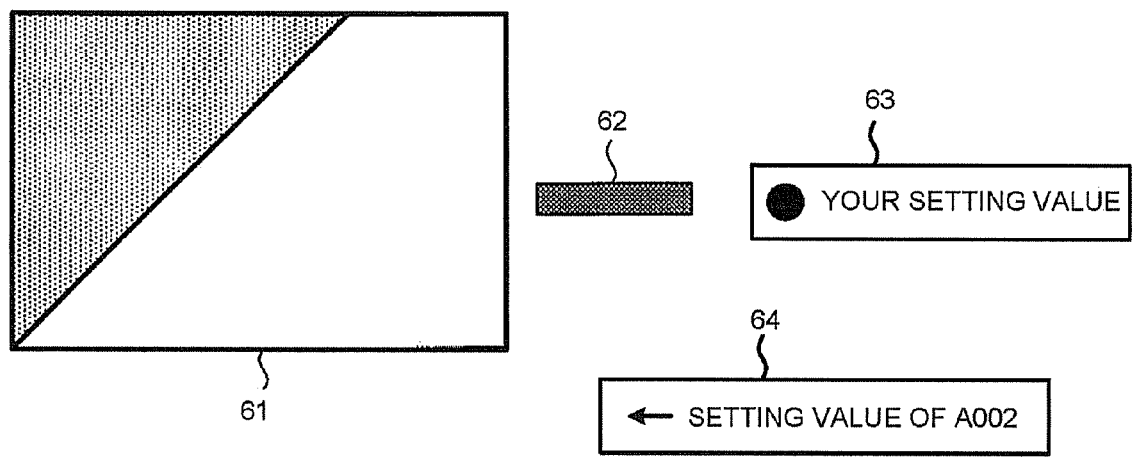
FIG. 11 is a diagram illustrating an example of a statistical graph image.

FIG. 11 is a diagram illustrating an example of a statistical graph image. The statistical graph image is produced by and stored in the server 30. The statistical graph image includes, for example, a statistical graph image 61, a statistical graph image 62, a statistical graph image 63 and a statistical graph image 64, which can be downloaded to the maintenance apparatus 10 and displayed after being combined. Related operation will be described later in detail.

Figure 12:
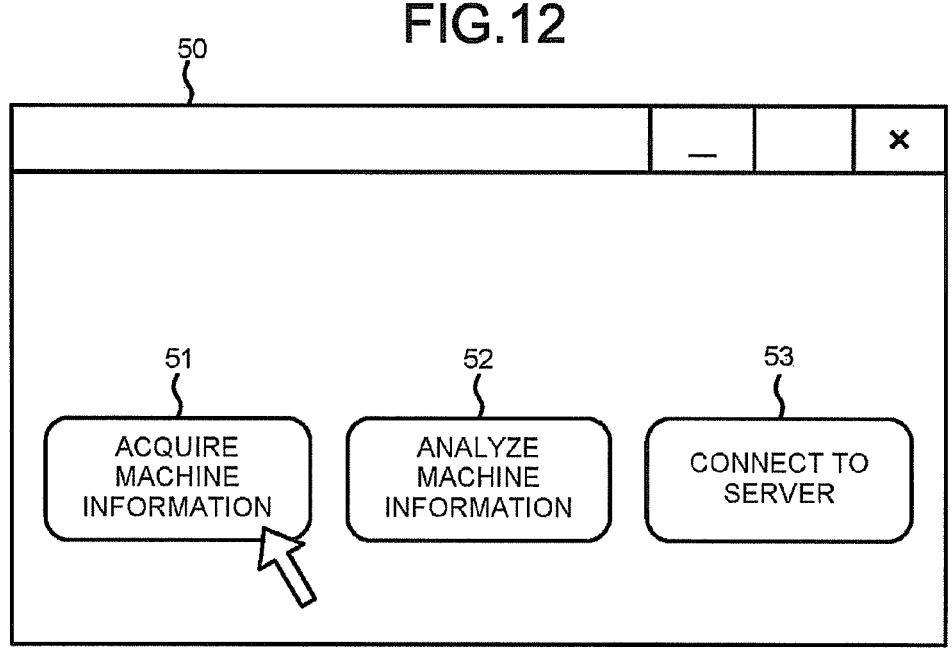
FIG. 12 is a diagram illustrating an example of the initial screen of the maintenance apparatus.

The actions of the maintenance apparatus 10 described in embodiment 1 are described below. If the application 131 is started, then as shown in FIG. 12, the application 131 displays an initial screen 50 on the display unit 18 through the display I/F 14 to wait for an input from the user. Three menus, that is, 'acquire machine information' menu 51, 'analyze machine information' menu 52' and 'connect server' menu 53, are displayed on the initial screen 50, and the user operates the input unit 19 to select a function to be executed from the menus. If there is an operation, then the operation is input to the maintenance apparatus 10 through the input I/F 15. In addition, the mentioned 'machine information' refers to machine identification information, error information, the setting value information of each setting item and the maximum value and the minimum value of the setting value.

The actions are described below with reference to the flowcharts and display screens shown in FIG. 13-FIG. 27.

Additionally, the actions presented in the following flowcharts are executed in accordance with the program stored in the recording unit 13 for maintaining the application 131.

Figure 13:
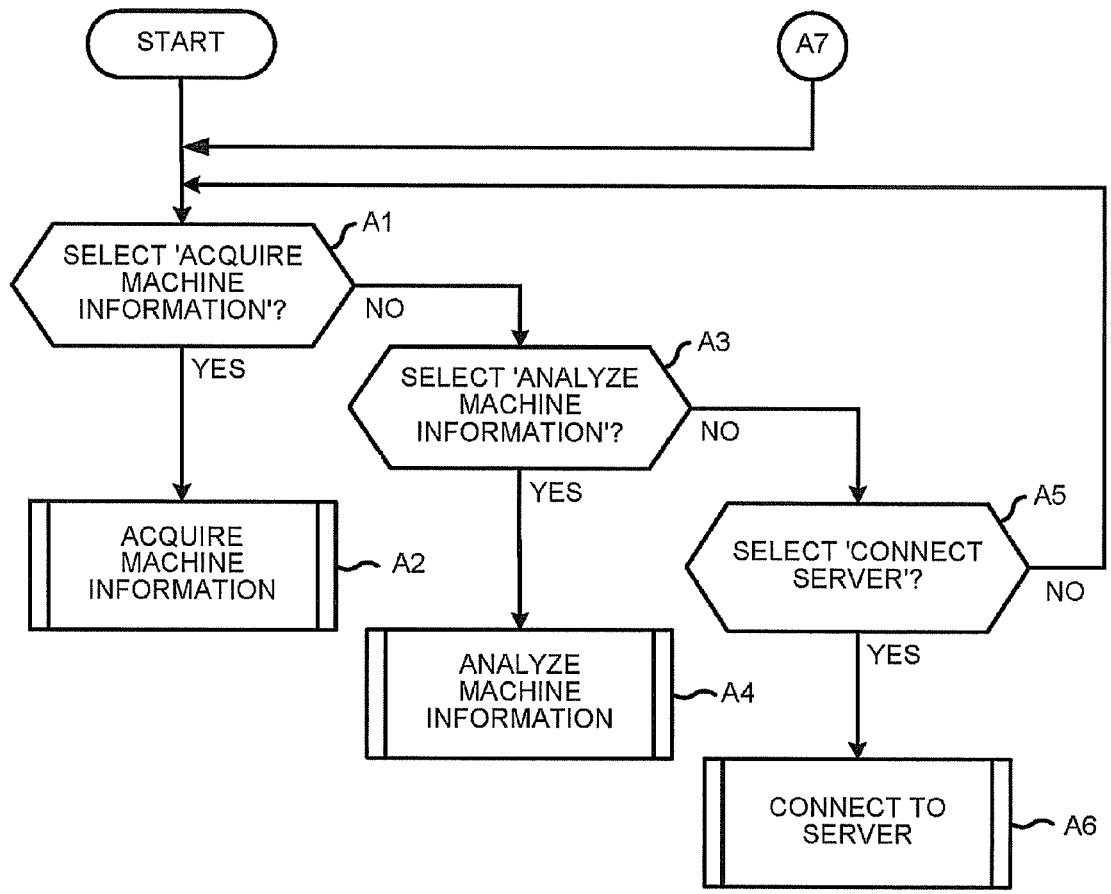
FIG. 13 is a flowchart illustrating an example of the outline of the actions of the maintenance apparatus.

For example, when the user select the 'acquire machine information' menu 51 from the initial screen 50 shown in FIG. 12, it is determined in Act A1 shown in the flowchart of FIG. 13 that the user selects the 'acquire machine information' menu, then a machine information acquisition processing A2 (FIG. 14) is started.

<Acquire Machine Information>

Figure 14:
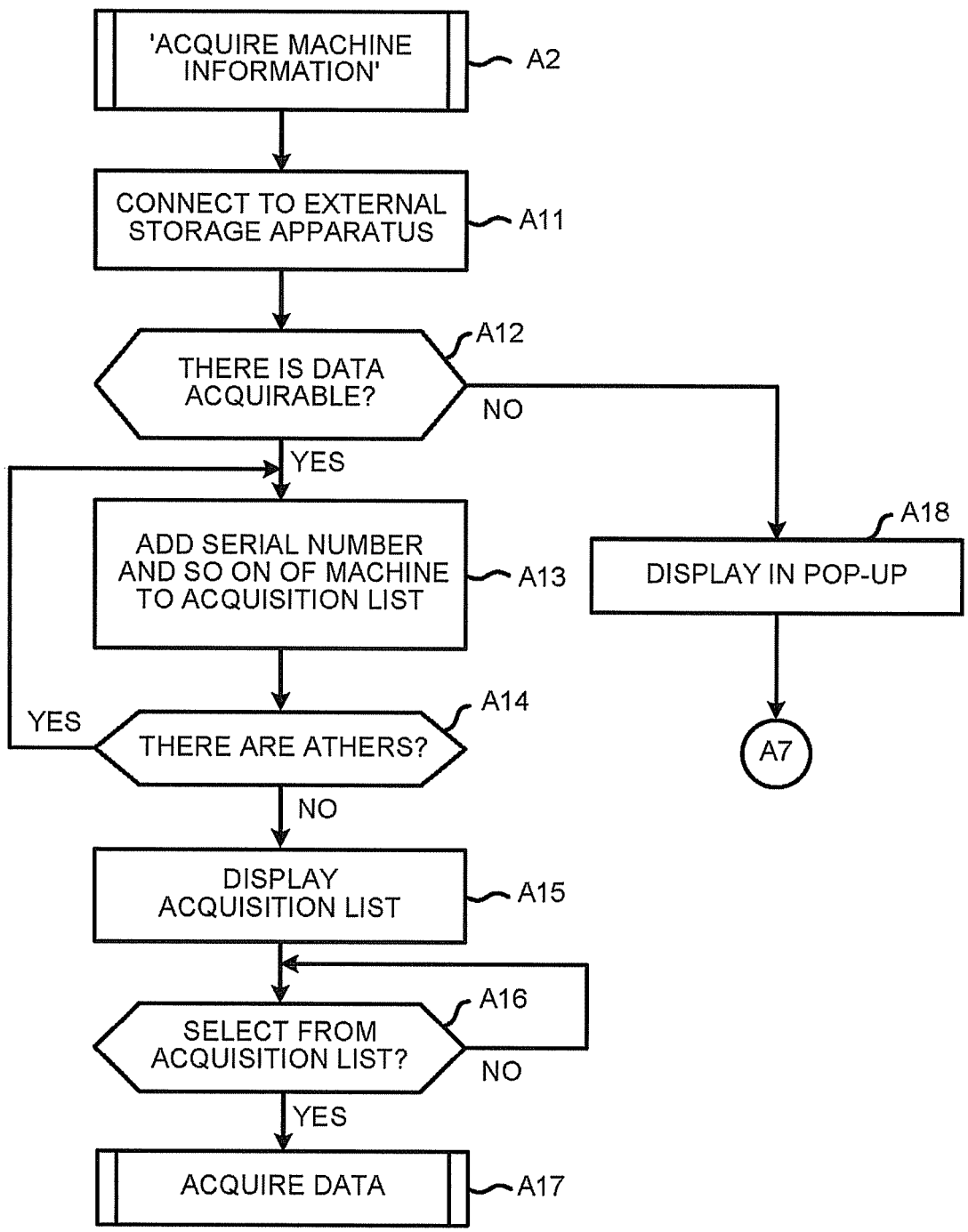
FIG. 14 is a flowchart illustrating the machine information acquisition actions of the maintenance apparatus.

The application 131 is connected with an external storage apparatus (USB memory 40) through the external storage apparatus I/F 16 in Act A11 shown in the flowchart of FIG. 14 and checks whether or not there is data to be stored in the database 132 from the external storage apparatus in Act A12. The mentioned 'retract' mentioned here refers to acquiring information from the USB memory 40 and is hereinafter referred to as 'acquire'. Data is stored in the USB memory 40 so that the data can be acquired to each machine, and the acquisition operation is carried out for each data of each machine.

If there is data acquirable, the serial number and the model name of the machine having acquirable data are added into an acquisition list in Act A13. It is determined in Act A14 whether or not there is other data acquirable, the flow returns to Act A13 to repeat the same action if there is other data acquirable. If there is more than one data acquirable, in Act A15, a data list is prompted to the user to enable the user to select a data to be acquired in Act A16. If the data to be acquired is selected, then a data acquisition processing A17 (FIG. 15) is started. On the other hand, if it is determined in Act A12 that there is no other data acquirable, content 'no data acquirable' is displayed in a prop-up window in Act A18, and it returns to initial screen.

Figure 15:
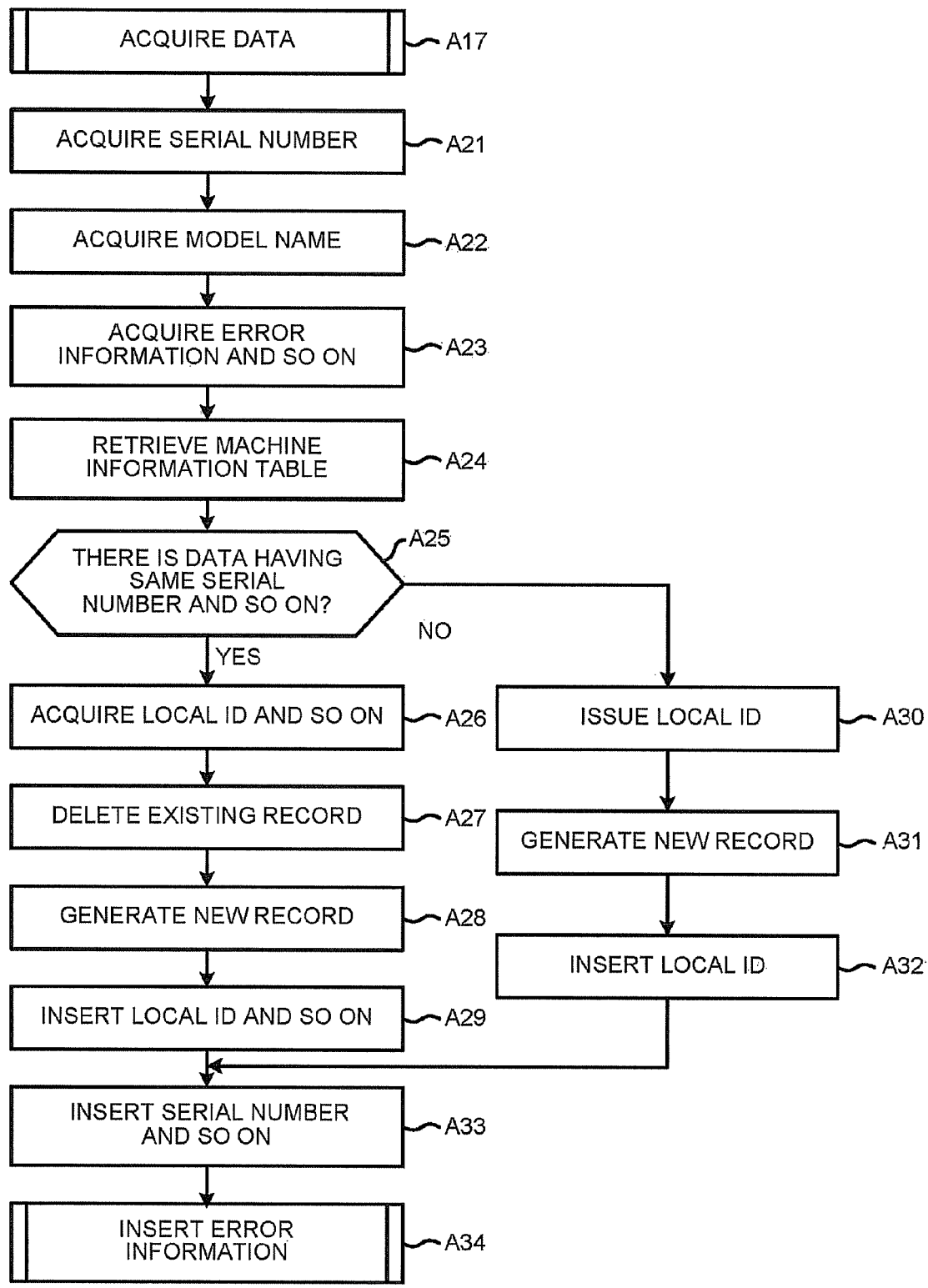
FIG. 15 is a flowchart illustrating the data acquisition actions of the maintenance apparatus.

After the data to be acquired is determined, the serial number of the selected machine is acquired in Act A21 shown in the flowchart of FIG. 15, a model name is acquired in Act A22, and error information and setting value information are acquired in Act A23. In Act A24, the machine identification information table in the database 132 is scanned (retrieved), and a check is carried out in Act 25 based on the serial number and the model name to check whether or not there is machine data the same as the data to be acquired. At this time, the application 131 scans the serial numbers and the model names of the data to be acquired and the data in the database 132.

If the data to be acquired and the data in the database 132 have the same serial number and the same model name, then it is determined that the machines are the same, and then flow proceeds to Act A26, otherwise, the flow proceeds to Act A30.

The reason for the synchronous scanning of the serial number and the model name lies in that the serial number is a unique number if the maintained objects are produced only one maker but not a unique number if maintained objects are produced by a plurality of makers. As a result, not only the serial number but also the model name is scanned. A maker name, but not limited to the model name, may also be effectively scanned along with the serial number. Additionally, if it can be guaranteed that the maintained objects are produced only one maker and a serial number is therefore not repeated, then it is allowable to scan the serial number only.

If machines having the same serial number and the same model name are detected in Act A25, then in Act A26, the global ID and the local ID the same as existing data are released to the data to be acquired, existing data (record) is deleted in Act A27, and new data (record) is produced in Act A28. The local ID and the global ID of the data to be acquired are inserted into the machine identification information table T1 in Act A29. Further, the serial number and the model name are inserted into the machine identification information table T1 in Act A33. A predetermined value such as 'null' or '-1' is inserted if no global ID is assigned.

Further, if it is determined in Act A25 that there are no machines having the same number and the same model name, then a new local ID is issued in Act A30. The new local ID is determined in the application 131 without repetition. For example, each local ID is a positive integer, and the maximum value of the local IDs issued is set to be the sum of the local ID issued last and 1. In this method, the value of the local ID to be issued is added by 1 every time a local ID is released so that the local IDs are not repeated.

A new record is made in the machine identification information table T1 in Act A31, the local ID of the data to be acquired is inserted into the machine identification information table T1 in Act A32, and a serial number and a model name are inserted into the machine identification information table T1 in Act A33. An error information insertion processing A34 is started (FIG. 16) after the insertion.

The naming of error information changes with model names and maker names, however, with the promotion of data standardization, there are many information which can be acquired in common between machines. Therefore, in order to acquire more information, a database column name-log data title correspondence table T3 (FIG. 6) is used to narrow the difference between machines so as to acquire error information.

Besides, the mentioned 'error information' refers to the data different from serial number, model name and setting value information, which may include drive time, printed sheet count and other data having no direct relation with an error. Moreover, error information contains a title (the type of data) and data (value).

Figure 16:
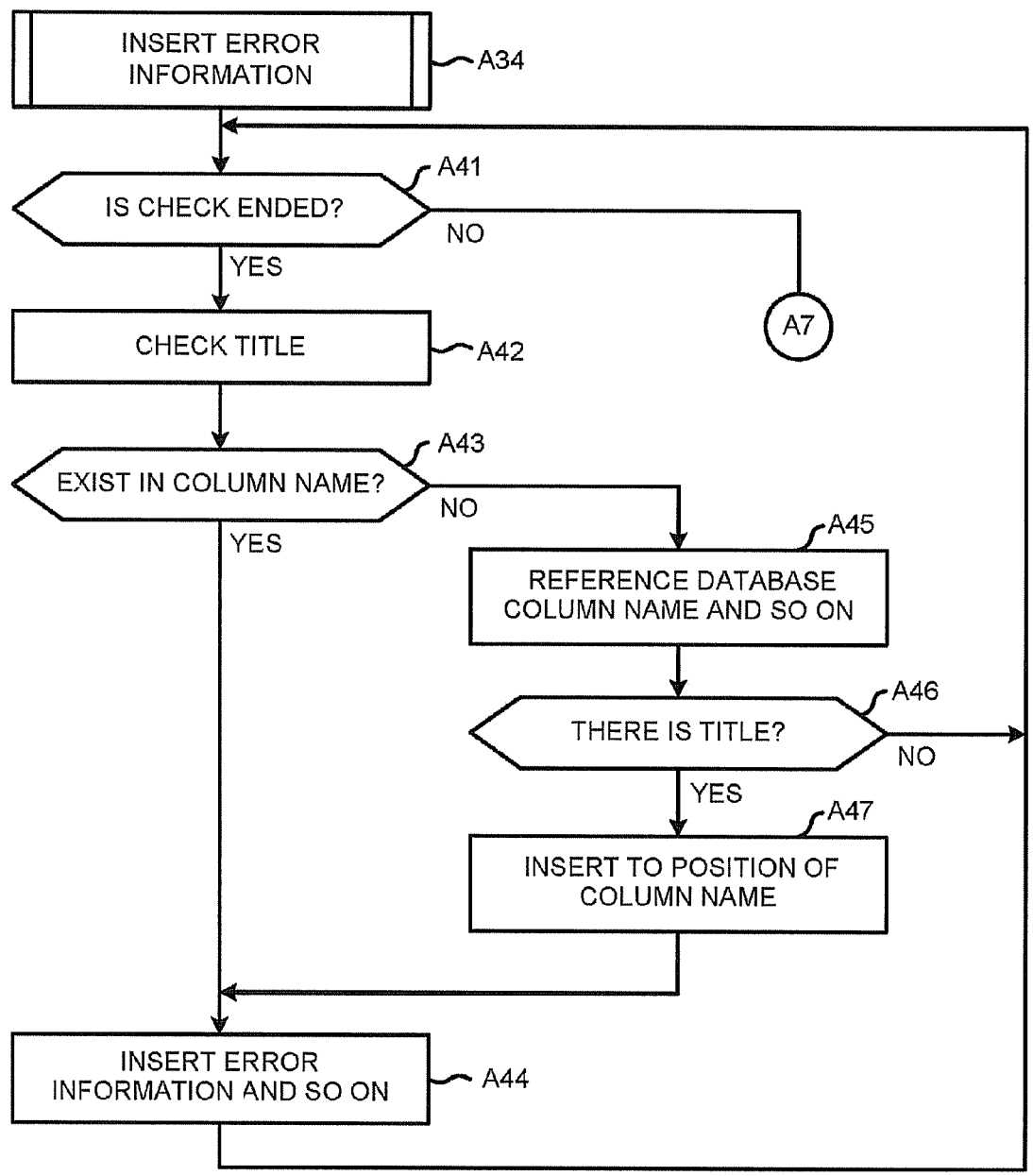
FIG. 16 is a flowchart illustrating the error information insertion actions of the maintenance apparatus.

In the error information insertion processing shown in the flowchart of FIG. 16, a determination is made first in Act A41 to determine whether or not there is data unchecked in error information. If there is data unchecked, the title of the data is acquired (checked) in Act A42. A determination is made in Act A43 to determine whether or not the title acquired is the same as a column name of the error information table T2, if there is a column name the same as the title, then error information and setting value information are inserted to the position of the column corresponding to the column name in Act A44.

If the acquired title in Act A43 is different from the titles existing in the column names of the error information table T2, then the database column name-log data title correspondence table T3 (FIG. 6) is referred to in Act A45. Column names of a database and the titles of the error information corresponding to the column names of the database are recorded in the correspondence table, the difference in the titles of error information can be corrected by reference to the correspondence table T3.

If a title exists in the correspondence table T3 in Act A46, then data is acquired and inserted to the position of a corresponding column name in Act A47. Further, error information and setting value information are inserted into the setting value information table T1 in Act A44.

Further, if no title existing in the correspondence table T3 in Act A46, then the flow returns to execute Act A41 but not to acquire the data. Further, if unchecked data is found in Act A41, then the check on error information is ended, and it returns to initial screen (Act A7).

<Analyze Machine Information>

If the user selects the 'analyze machine information' menu 52 in the menu screen shown in FIG. 12, that is, the result of the determination carried out in Act A3 is 'YES', then a machine information analysis processing A4 (FIG. 17) is started. In the machine information analysis processing A4, the screen shown in FIG. 18 is displayed on the display unit 18 so that the user can make a selection between an analysis on each machine and an analysis on each item for all machines.

Figure 18:
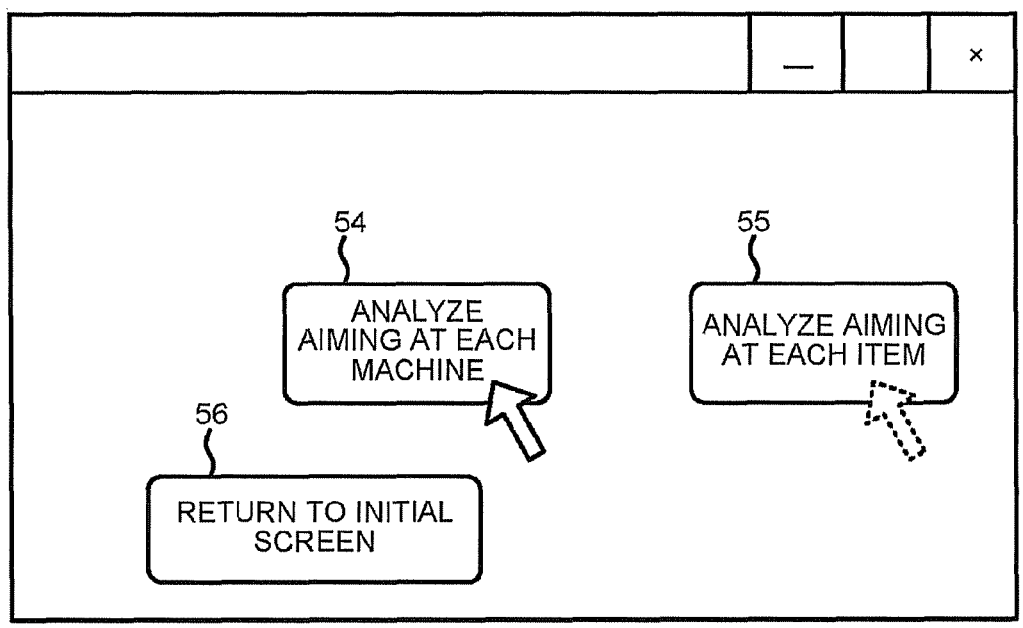
FIG. 18 is a diagram illustrating an example of the machine information analysis screen of the maintenance apparatus.

Buttons such as a 'analyze each machine' button and a 'analyze each item' button are displayed in the screen shown in FIG. 18 for the user to select. Moreover, to return to the initial screen (FIG. 12), a button 'return to initial screen' 56 is pressed.

Figure 17:
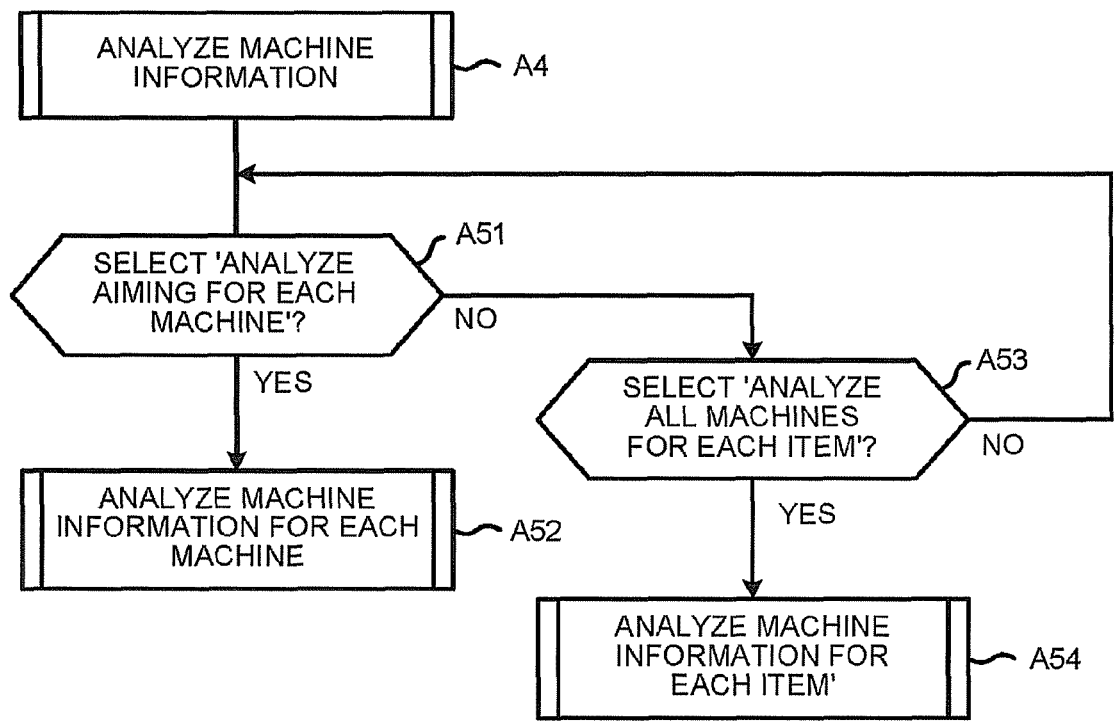
FIG. 17 is a flowchart illustrating the machine information analysis actions of the maintenance apparatus.

If the 'analyze each machine' button is selected in Act A51 shown in the flowchart of FIG. 17, a processing of analyzing machine information for each machine (FIG. 19) is started in Act A52, and if the 'analyze each item for all machines' button is selected in Act A53, a processing of analyzing machine information for each item (FIG. 21) is started in Act A54.

<Analyze Each Machine>

Figure 19:
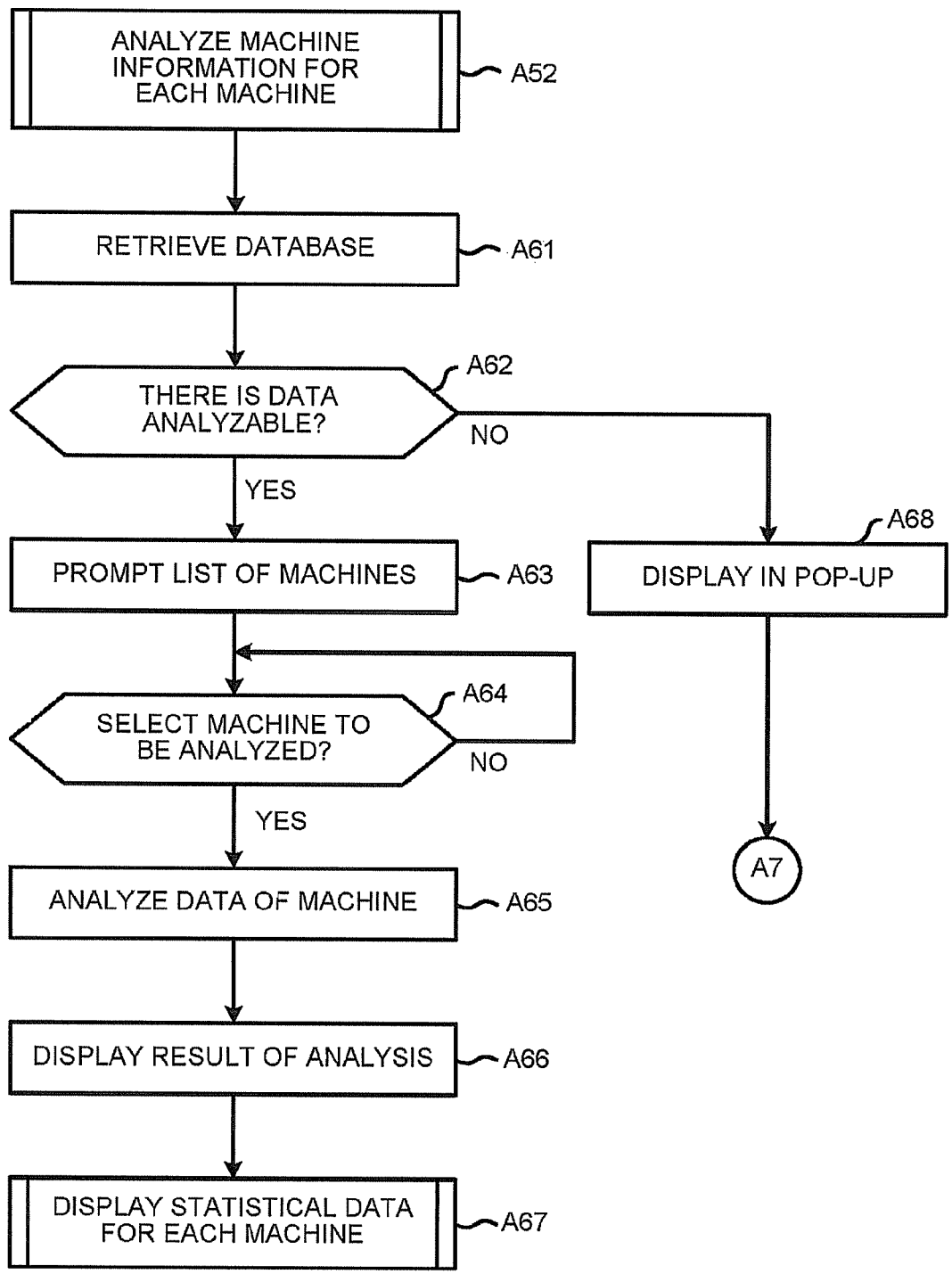
FIG. 19 is a flowchart illustrating an analysis action of the machine information of each machine of the maintenance apparatus.

If the 'analyze each machine' button is selected in Act A51, the application 131 scans the machine identification information table T1 in the database 132 in Act A61 shown in the flowchart of FIG. 19 and checks whether or not there is data analyzable in Act A62. If there is more than one data analyzable, a list of the machines analyzable is prompted to the user in Act A63.

The user selects the data to be analyzed in Act A64, if a machine to be analyzed is selected, then the data of the machine selected is analyzed in Act A65, and the result of the analysis is displayed in Act A66. Act A67 is a process of displaying statistical data to each machine, which will be described in detail in FIG. 20. Further, if it is determined in Act A62 that there is no data analyzable, content 'no data analyzable' is displayed in a prop-up window in Act A68 and it returns to initial screen.

If the statistical graph of the setting items of the selected machine is displayed as a result of the analysis, a setting item-statistical graph pattern correspondence table T5 (FIG. 8) is referred to.

Figure 20:
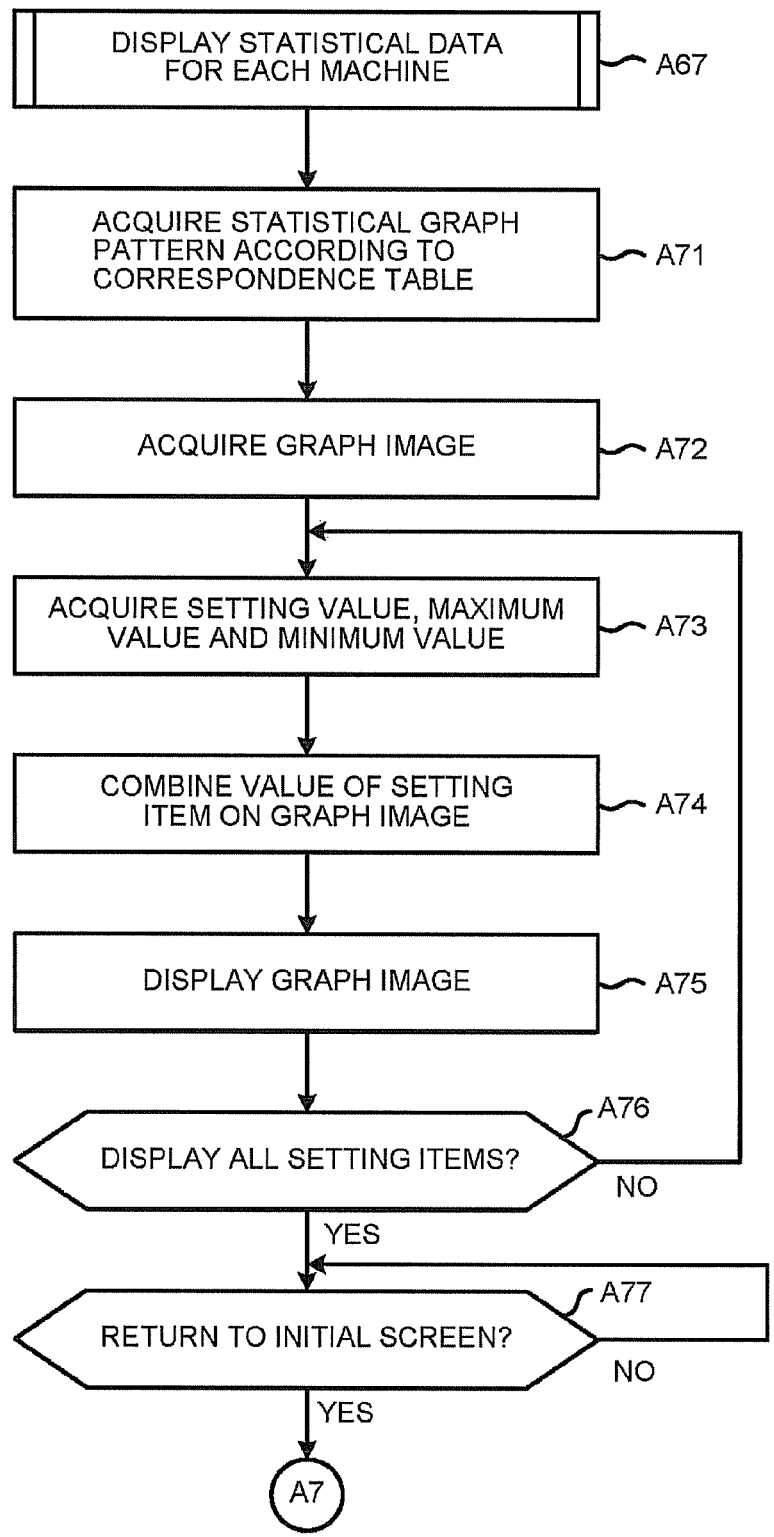
FIG. 20 is a flowchart illustrating the display of statistical data to each machine of the maintenance apparatus.

In Act A71 shown in the flowchart of FIG. 20, a retrieval is generated in the correspondence table T5 by taking a model name and a setting item as keys, and a statistical graph pattern is acquired if there is a record on the object.

In addition, it is assumed that the statistical graph pattern may change with different model names and setting items and is not necessarily determined by a model name and a setting item. For example, a statistical graph pattern may also be determined by a region, the year of manufacture and the location of manufacture.

Next, in Act A72, with reference to the statistical graph pattern-graph image correspondence table T6 (FIG. 9), the name of the statistical graph image is acquired using the acquired statistical graph pattern, thereby acquiring a statistical graph image 61 (FIG. 11). Then, statistical graph images (62, 63) are acquired (FIG. 11). Each of the statistical graph images (62, 63) may be identically set for all setting values or prepared for each setting item.

The statistical graph image 61 is a graph image (statistical image) representing a statistics of the setting values generated for each setting item based on the machine information (especially setting value information) acquired from a plurality of image forming apparatuses 20. The statistical graph image 61 is generated by the server 30, and the graph image (statistical image) is acquired by the maintenance apparatus 10 from the server 30 through the network I/F 17. Therefore, the network I/F 17 constitutes an statistical image acquisition unit.

Next, a setting value is read from the setting value information table T4 (FIG. 7) in Act A73. A maximum value and a minimum value may also be read at this time. The maximum value and the minimum value refer to the maximum value and the minimum value the setting value can be. Here, the maximum value and the minimum value exist in the setting value table, that is, the table acquired from the image forming apparatus 20; however, the maximum value and the minimum value may exist in a table downloaded from the server 30.

In FIG. 11, the x axis of the statistical graph image 61 represents the unit number, the y axis of the statistical graph image 61 represents a setting value, and the leftmost bottom point in the pattern represents the original point (coordinate (0, 0)). Moreover, the statistical graph image 62 is a transverse bar chart (or simplified curve), when the length of one side of the chart is 1, the statistical graph image 62 is displayed at a position where the coordinate is (0, ((setting value-minimum value)/(maximum value-minimum value))). The statistical graph image 62 is a setting value image the display position of which is determined by setting value information.

Moreover, the statistical graph image 63 is displayed by the statistical graph image 62 at a distance of X1. Besides, the distance X1 is an optionally set distance which is set to make the statistical graph image 63 close to the statistical graph image 62. The display coordinate of the statistical graph image 63 is (horizontal width of statistical graph pattern 62)+X1), ((setting value-minimum value)/(maximum value-minimum value))).

Moreover, statistical graph image 62 and 63 are displayed on the z axis by being overlapped on the statistical graph images 62 and 63 are overlapped on the statistical graph image 61, and the greater the coordinate of the z axis is, the nearer the overlapping side is, thus, (the z axis of the statistical graph image 61)<(the z axis of the statistical graph image 62)≤(the z axis of the statistical graph image 63).

In Act A74, the image of graph images 62 and 63 are combined at the position of the value of the setting item of the statistical graph image 61, and the combined graph image is displayed in Act A75.

Whether or not all the setting items serving as analyzed objects are displayed is determined in Act A76, if there is still an object to be displayed, the flow returns to Act A73 to repeat the processing, and if all the setting items are displayed, whether or not the button for returning to the initial screen is pressed is determined in Act A77. The button for returning to the initial screen is configured on the screen on which the result of the analysis is displayed, and it returns to initial screen if the button is pressed.

Figure 23:
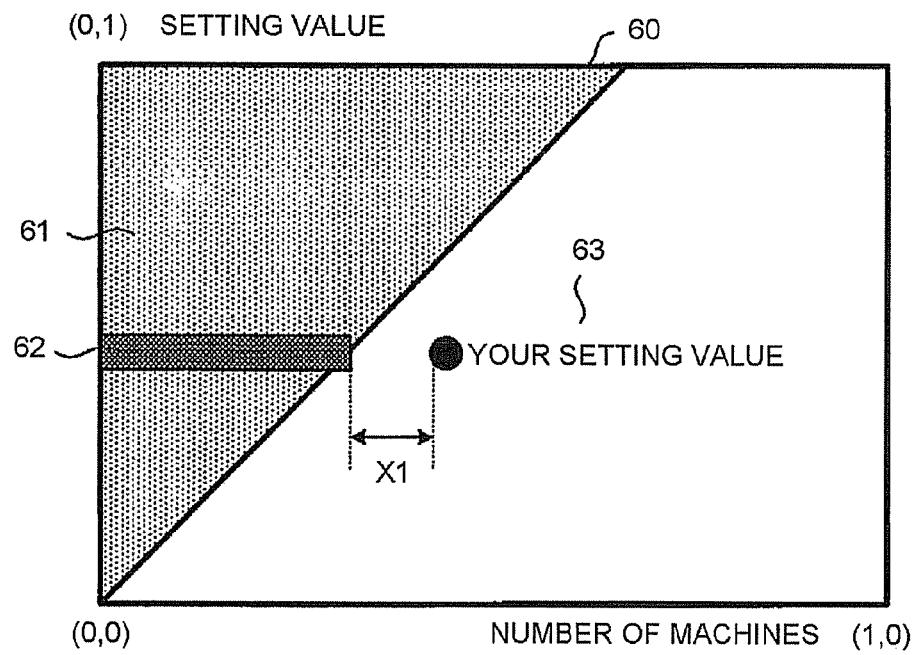
FIG. 23 is a diagram illustrating an example of the combining processing of the statistical graph patterns displayed on the display unit of the maintenance apparatus.

FIG. 23 shows an example of the display of the statistical graph images 62 and 63 combined on the statistical graph image 61. In FIG. 23, with respect to the statistical graph image 61 (statistical image), the statistical graph image 62 may be used to represent a position equivalent to the value of a setting item of the machine serving as an analyzed object. The generating of the setting value image and the combination of the generated setting value image with the statistical image are carried out by the processing unit 11. Thus, the processing unit 11 constitutes a display processing unit 11 for generating a setting value image and combining the generated setting value image with a statistical image.

Further, in the example shown in FIG. 23, the amount of such machines as setting value is [1] is the largest, and the amount is the least in those setting value is [0].

Further, the statistical graph image 62 is a setting value image the vertical axis display position of which changes with the actual setting value of the machine serving as an object. Further, the length of the horizontal axis of the statistical graph image 62 is changed in accordance with the statistical graph image 61. Additionally, the statistical graph image 63 is displayed by the statistical graph image 62 at a distance of X1 in the form of an image in which words like 'your setting value' are contained.

The position at which the setting value of the machine serving as an analyzed object is located can be visually determined with reference to the image of FIG. 23. Therefore, an error may occur when the position of the setting value is too low, then an adjustment on the setting value is needed. Moreover, if the setting value is at a position where most machines are located, then it can be determined that the setting value is normal.

Figure 25:
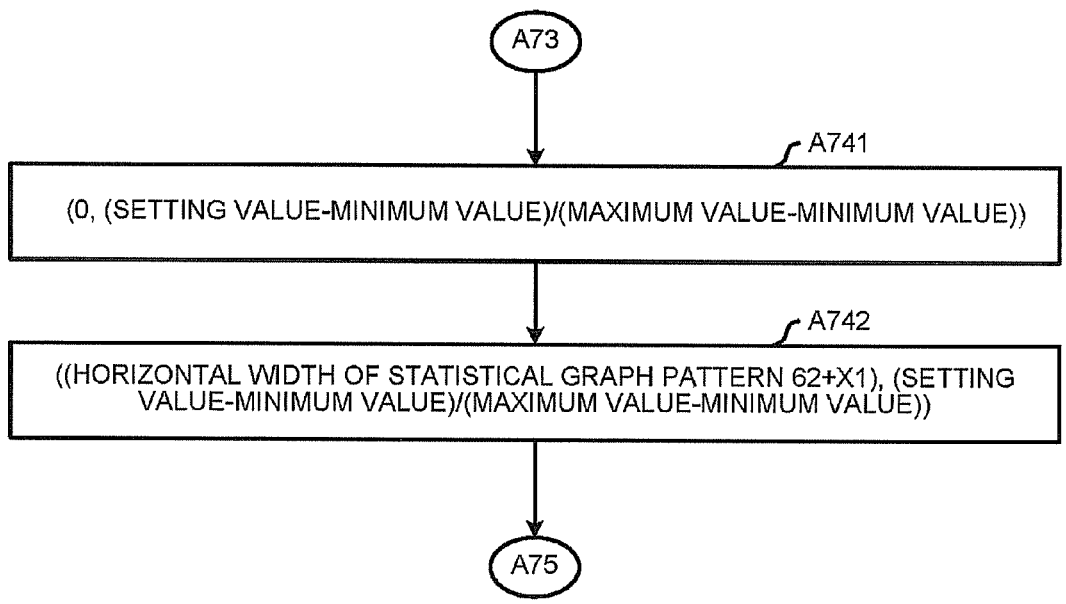
FIG. 25 is a flowchart illustrating the detailed actions of Act 74 shown in FIG. 20.

As shown in FIG. 25, the detailed content of Act A74 shown in the flowchart of FIG. 19 includes an Act A741 and an Act A742. In Act A741, the statistical graph image 62 is overlapped on a nearer side of the statistical graph image 61. Moreover, in Act A742, the statistical graph image 63 is overlapped at the position of the statistical graph image 62 or on a nearer side.

Additionally, the method for describing the value of a setting item on the statistical graph image 61 is not limited to the combination of a plurality of images shown in FIG. 23. For example, a method of directly editing the pattern copies of statistical graph images may be used, or a plurality of pre-combined images may be prepared.

<Analyze all Machines for Each Item>

Figure 21:
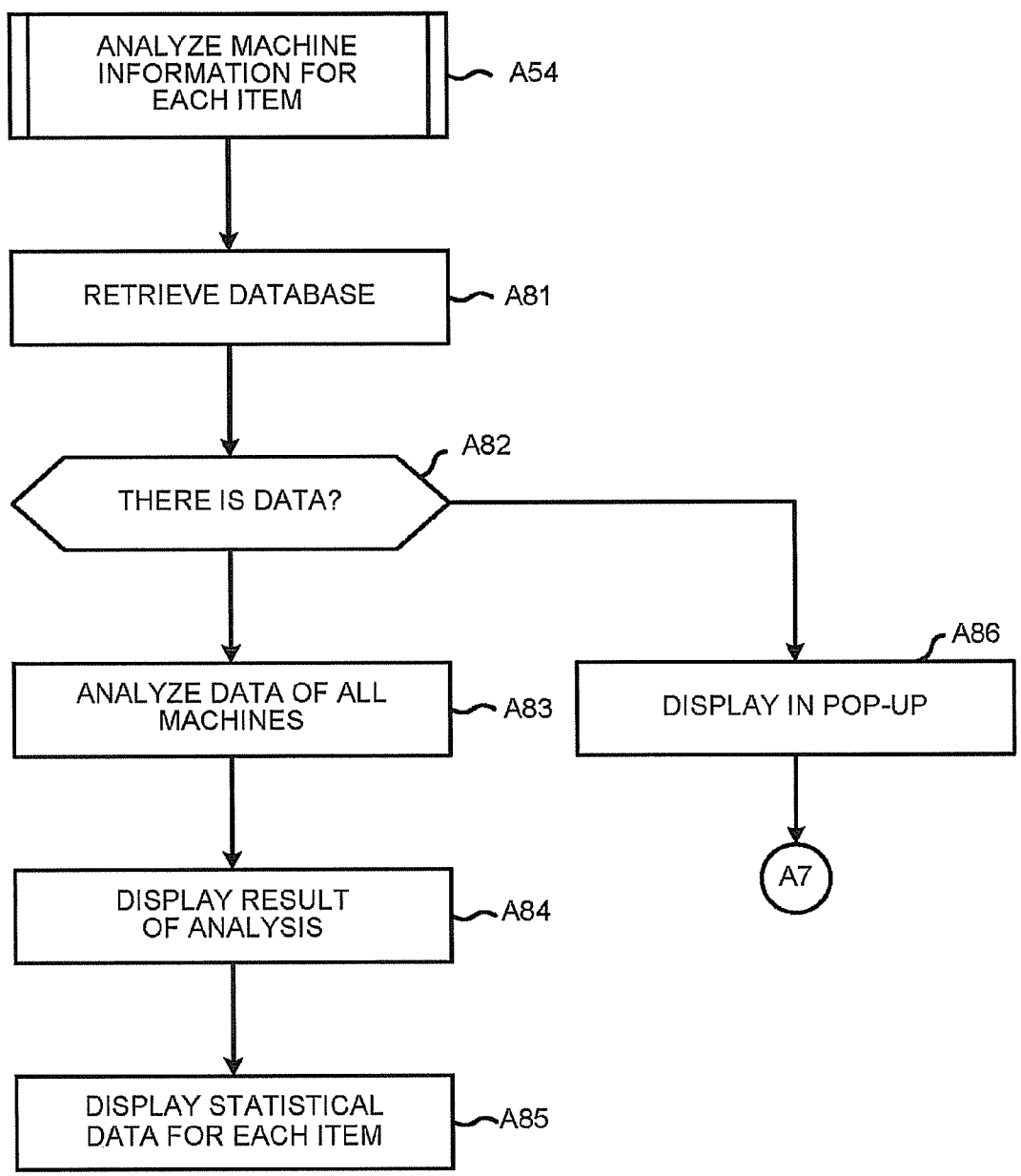
FIG. 21 is a flowchart illustrating the machine information analysis actions for each item of the maintenance apparatus.

If it is determined in Act A53 shown in the flowchart of FIG. 17 that the 'analyze all machines for each item' button is selected, the application 131 scans the machine identification information table T1 (FIG. 4) in the database 132 in Act A81 shown in the flowchart of FIG. 21 and checks whether or not there is data analyzable in Act A82.

If there is data analyzable, the data of all machines is analyzed for each item in Act A83, and the result of the analysis is displayed in Act A84. The following Act A85, which is a process of displaying statistical data for each item, is described in detail with reference to the flowchart of FIG. 22.

Moreover, if it is determined in Act A82 that there is no data analyzable, content 'no data analyzable' is displayed in a prop-up window in Act A86, and it returns to initial screen. Additionally, the mentioned 'all machines' refers to all the machines the data of which is stored in the database 132. When the statistical graph image of a certain setting item is displayed as the result of the analysis, a setting item-statistical graph pattern correspondence table T5 (FIG. 8) is referred to.

Figure 22:
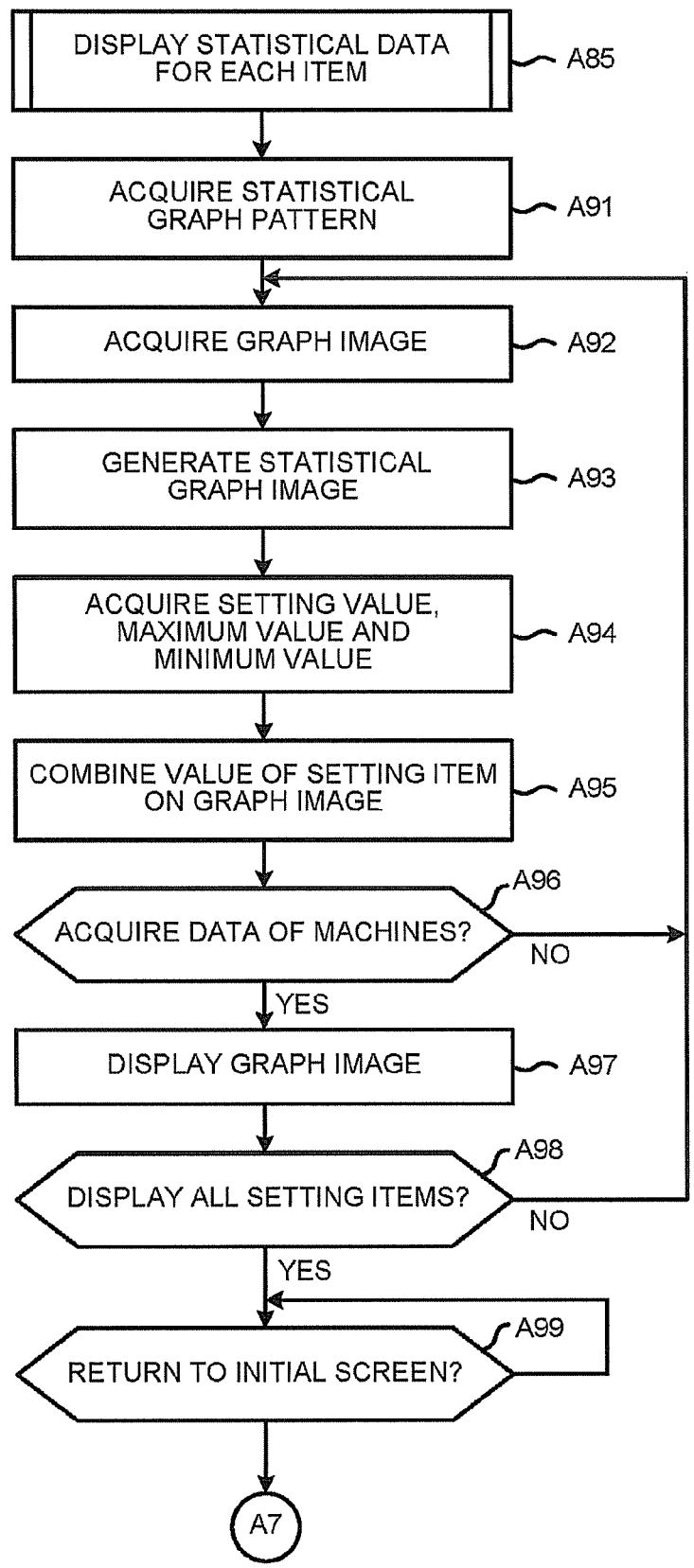
FIG. 22 is a flowchart illustrating the statistical data display actions for each item of the maintenance apparatus.

In Act A91 shown in the flowchart of FIG. 22, a retrieval is performed in the correspondence table T5 by taking a model name and a setting item as keys, and a statistical graph pattern is acquired if there is a record on the object. In addition, it is assumed in a case that statistical graph pattern may change with different model names and different setting item and is not necessarily determined by a model name and a setting item. For example, the statistical graph pattern may also be determined by a region, the year of manufacture and the location of manufacture.

Next, in Act A92, a statistical graph image is acquired from the acquired statistical graph pattern with reference to the statistical graph pattern-graph image correspondence table T6 (FIG. 9), in this way, statistical graph images 61 and 62 are acquired. The statistical graph image 62 may be identically set for all setting values or prepared for each setting item. Additionally, a statistical graph image 64 (FIG. 11) is generated in Act A93.

For example, if the serial number of the machine the data of which is to be read is AA002, a graph image 64 such as 'setting value of AA002' is generated. Further, the graph image 64 may also be generated by the server 30 and downloaded to the maintenance apparatus 10 along with statistical graph images 61 and 62 for a use. Further, if it is desired to form an image identical to an existing graph image, then the existing graph image can be used. Moreover, the graph image 64 may be displayed as a tooltip, in which the serial number of a corresponding machine is displayed when the cursor is aligned to the graph image 62 using a mouse.

Next, setting values are read from the setting value information table T4 (FIG. 7) in Act A94. The setting values read at this time are a maximum value and a minimum value, which refer to the maximum value and the minimum value the setting value can be. Here, the maximum value and the minimum value exist in the setting value table, that is, the table acquired from the image forming apparatus 20; however, the maximum value and the minimum value may exist in a table downloaded from the server 30. In addition, a rereading process is not needed if the maximum value and the minimum value are read.

The x axis of the statistical graph image 61 represents the number of machines, the y axis of the statistical graph image 61 represents setting values, and the leftmost bottom point in the image represents an original point (coordinate (0, 0)). Moreover, the statistical graph image 62 is a transverse bar graph (or simplified graph), in which the x axis represents the number of machines and the y axis represents setting values. The leftmost bottom point of the image is an original point (coordinate (0, 0)), when the length of one side of the image is 1, the statistical graph image 62 is displayed at a position where the coordinate is (0, (setting value-minimum value)/(maximum value-minimum value)). The statistical graph image 62 is a setting value image the display position of which is determined by setting value information.

Additionally, there is no need to display the statistical graph image 62 again if images of other machines are displayed in the area where the statistical graph image 62 should be displayed. Moreover, when the statistical graph image 64 is displayed by the statistical graph image 61 at a distance of X1, the display coordinate of the statistical graph image 64 is (horizontal width of statistical graph image 62)+X1), ((setting value-minimum value)/(maximum value-minimum value))).

However, if images of other machines are displayed in the area where the statistical graph image 64 should be displayed, the y coordinate of the statistical graph image 64 is shifted by the longitudinal width of the statistical graph image 64 or the display is terminated so that the images will not be overlapped.

Further, statistical graph images 62 and 64 are displayed on the z axis by being overlapped on the statistical graph image 61, and the greater the coordinate of the z axis is, the nearer the overlapping side is, thus, the z axis of the statistical graph image 61<the z axis of the statistical graph image 62≤the z axis of the statistical graph image 64. In Act A95, a value is synthesized at the position of the setting item of the statistical graph image 61 (FIG. 11).

A determination is made in Act A96 to determine whether or not the data of all the machines serving as objects is acquired, and the position equivalent to the value of the setting item acquired for the statistical data is displayed in Act A97 through graph images 61, 62 and 64.

whether or not a display is carried out for all setting items of the displayed object is determined in Act A98, if there is still an object to be displayed, the flow returns to Act A93 to repeat the processing, and if all setting items are displayed, a determination is made in Act A99 to determine whether or not the button for returning to the initial screen is pressed. The button for returning to the initial screen is configured on the screen on which the result of the analysis is displayed, and if the button is pressed, the initial screen is returned.

Figure 24:
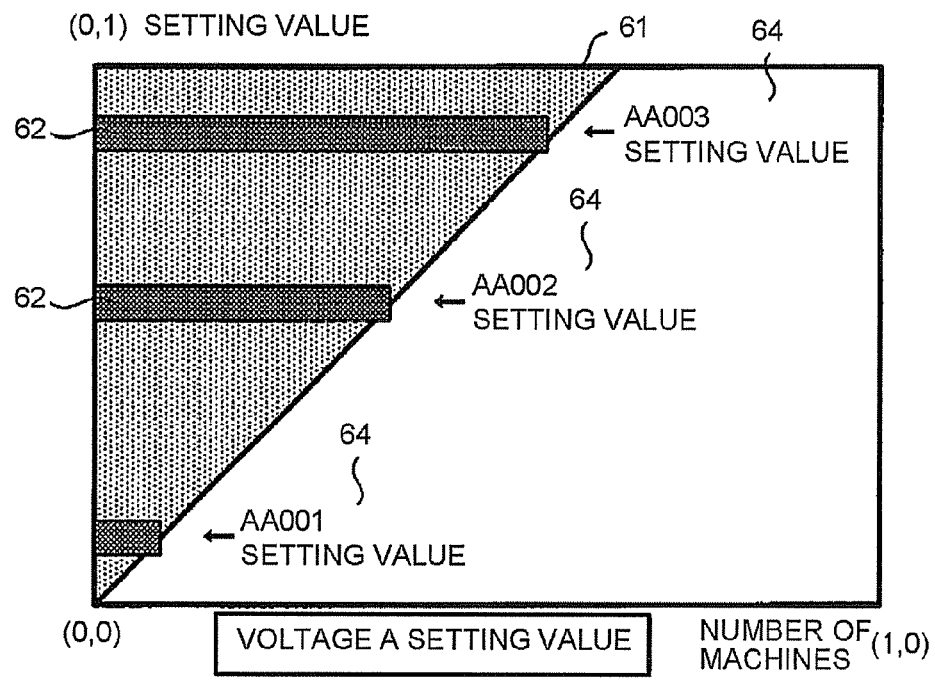
FIG. 24 is a diagram illustrating an example of the graph patterns analyzed by the machine of each item displayed on the display unit of the maintenance apparatus.

FIG. 24 shows an example of the display of the statistical graph images 62 and 64 combined on the statistical graph images 61. In FIG. 24, an example is given in which setting value images of the machines the serial numbers of which are AA001, AA002 and AA003 are synchronously displayed.

The position at which the setting value of each machine is located can be visually determined for each setting item with reference to the graph image of FIG. 24. Therefore, an error may occur when the position of the setting value of a machine is too low, then an adjustment on the setting value is needed. Moreover, if the setting value of a machine is at a position where most machines are located, then it can be determined that the setting value is normal.

Figure 26:
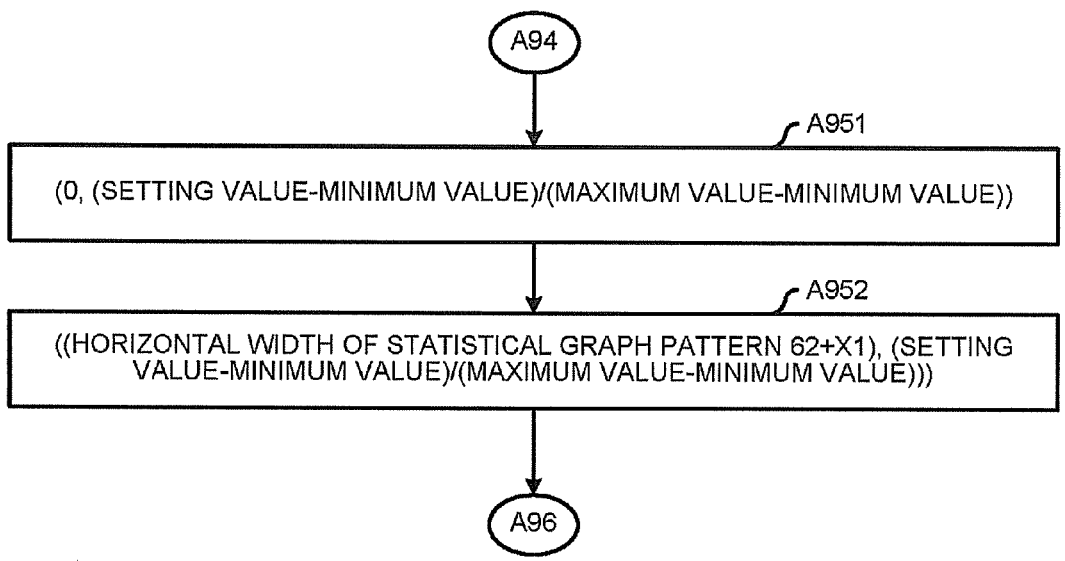
FIG. 26 is a flowchart illustrating the detailed actions of Act 95 shown in FIG. 22.

As shown in the flowchart of FIG. 26, the detailed content of Act A95 includes an Act A951 and an Act A952. In Act A951, the statistical graph image 62 is overlapped on a nearer side of the statistical graph image 61. In Act A952, the statistical graph image 64 is overlapped at the position of the statistical graph image 62 or on a nearer side.

Additionally, the method for describing the value of a setting item on the statistical graph image 61 is not limited to the combination of a plurality of images. For example, a method of directly editing the pattern copies of statistical graph images may be used.

<Connect Server>

Figure 27:
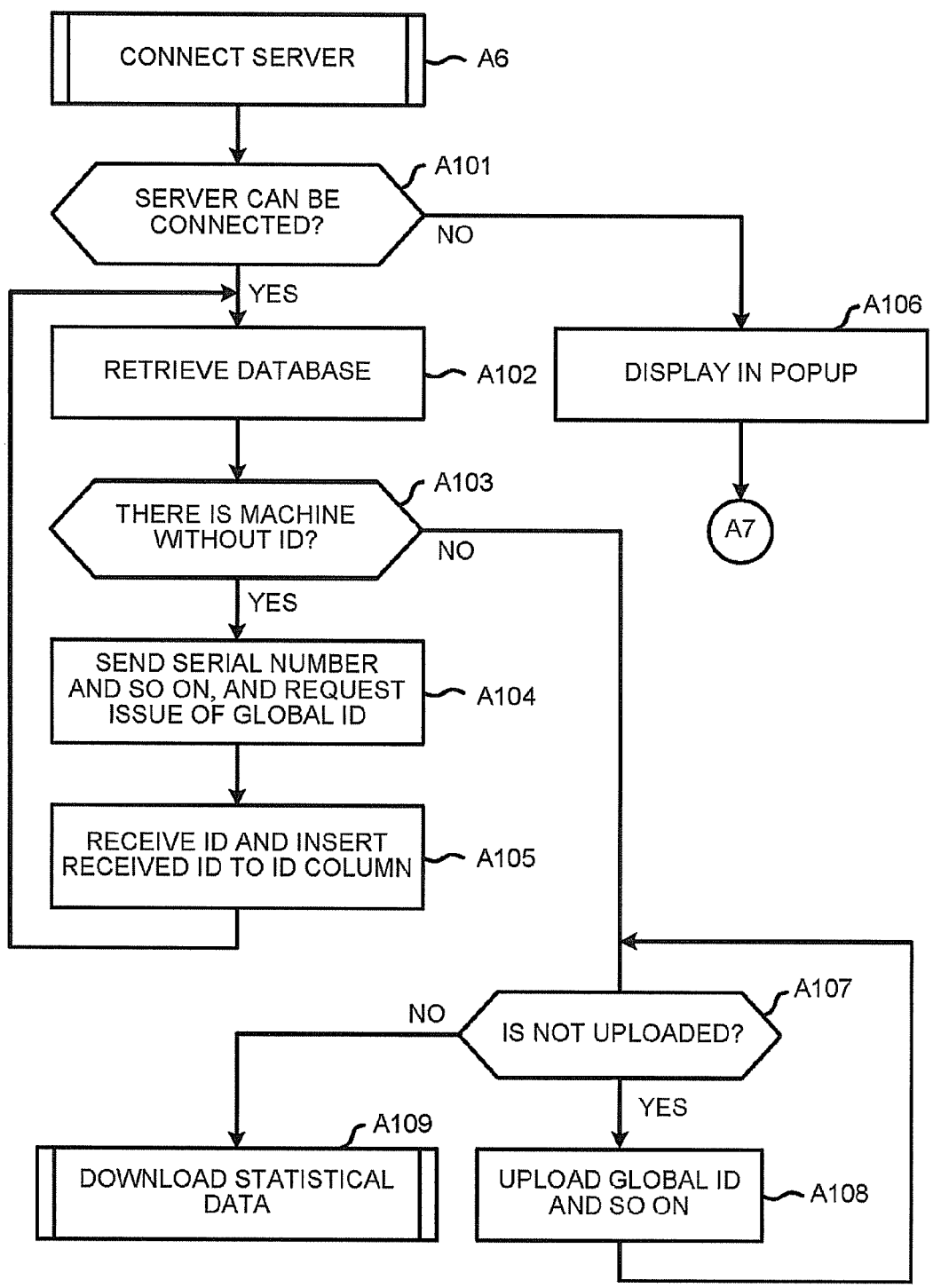
FIG. 27 is a flowchart illustrating the connection actions of the maintenance apparatus with a server.

If the user selects the 'connect server' menu 53 on the menu screen of FIG. 12, the application 131 determines whether or not the server 30 for data collection can be accessed through the network I/F 17 in Act A101 shown in the flowchart of FIG. 27.

If it is determined that the access is available, the application 131 scans (retrieves) the machine identification information table T1 (FIG. 4) in the database 132 in Act A102 and checks whether or not there is a machine assigned with no global ID in Act A103. If there is a machine assigned with no global ID, the application 131 uploads (sends) a serial number and a model name to the server 30 and requests issuing of a global ID in Act A104.

If a global ID is issued from the server 30, then the global ID is received and then assigned to a corresponding machine and inserted to the 'global ID' column in Act A105, then the flow returns to Act A102 to repeat the processing. Moreover, if it is determined in Act A101 that the server 30 cannot be connected, in Act A106, content 'server cannot be connected' is displayed in a prop-up window so that the user is ingenerated of the situation, and it returns to the initial screen Additionally, when the application assigns an ID by itself or in the case where the server 30 can identify the application 131 accessing the server using an MAC address or other methods, a local ID and information for identifying the application 131, instead of the serial number and the model name, are uploaded to request a global ID.

However, if the situation is taken into consideration that a plurality of service persons access the same machine, information (e.g. serial number and model name) for specifying a machine independent from the application 131 is preferably uploaded.

Whether or not any machine left not being uploaded is determined in Act A107, after each machine is assigned with a global ID, the global ID, error information and setting value information are uploaded to the server 30 in Act A108. Moreover, if it is determined in Act A107 that there is no machine that is not uploaded, then Act A109 is carried out to carry out a statistical data download processing (FIG. 28)

The flowchart of FIG. 28 shows the statistical data download processing. In Act A111 shown in the flowchart of FIG. 28, the download of the setting item-statistical graph pattern correspondence table T5 (FIG. 8) and the statistical graph pattern-graph image correspondence table T6 from the server 30 is requested. In Act A112, the setting item-statistical graph pattern correspondence table T5 (FIG. 8) and the statistical graph pattern-graph image correspondence table T6 are received. If the correspondence tables T5 and T6 already exist locally, then the tables are stored after being overwritten. However, the download may be saved if each correspondence table in the server 30 is the same as that existing locally.

The download of statistical graph images 61, 62 and 63 corresponding to the statistical graph pattern from the server 30 is requested in Act A113, and the statistical graph images 61, 62 and 63 are received in Act A114. If the statistical graph images locally exist, then the statistical graph images are stored after being overwritten. However, the download may be saved if the statistical graph images in the server 30 are the same as those existing locally. The initial screen is returned after the statistical graph images 61, 62 and 63 are received.

As stated above, the maintenance apparatus 10 provided in the embodiment may acquire the machine information of the image forming apparatus 20 through a pluggable external storage apparatus such as a USB memory 40 and combines the setting value information of the machine with a proper position of the statistical graph image and then displays the combined pattern. Thus, the reason why an error occurs may be speculated by viewing the position of the image information shown by the setting value on the statistical graph pattern, and then a maintenance operation can be carried out timely.

Further, as the setting value information of a plurality of machines may be displayed on the statistical graph image for each setting item, the condition of each machine and the occurrence of an error can be mastered through a display operation at once.

Therefore, even the machine state of an offline image processing apparatus can be prompted to carry out a maintenance operation. Moreover, when the service person maintains the image forming apparatus on the site, the setting value of the machine can be indicated so that the service person can adjust the setting value to prevent the occurrence of a fault.

Besides, the processing described in the embodiment may be achieved by hardware or by executing the application (computer program) stored in the recording unit 13 (e.g. memory) through the processing unit 11 (e.g. CPU).

Further, in the embodiment, the maintenance apparatus may consist of a single PC or a PC and a server 30. For example, a part of the functions of a PC are provided in the server to display various analysis results on the PC using the information from the server.

Further, an image processing apparatus is described herein as a machine maintained; however, the object maintained by the maintenance apparatus is not limited to the image processing apparatus. For example, the maintenance apparatus may maintain various information processing apparatuses such as a POS (Point Of Sales) installed in a business facility.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A maintenance method for an information processing apparatus, comprising:

acquiring, by a processor, a machine identification information for identifying the machine of the information processing apparatus and a machine information includes a setting value information of a plurality of setting items of a machine and an error information of the machine from an external storage apparatus;

storing, by the processor, the acquired machine information in association with the machine identification information in a database, and storing, by the processor, a setting value of each setting item and a maximum value and a minimum value of the setting value as the setting value information of the machine in the database;

acquiring, by the processor, a statistical image which is generated based on the setting value information of a plurality of information processing apparatuses from a server;

generating a setting value image determined by the setting value information of the machine based on the machine information stored in the database by a display processing unit, and combining the setting value image with the statistical image by the display processing unit; and displaying the combined image on a display unit.

2. The maintenance method for an information processing apparatus according to claim 1, wherein
the statistical image is generated for each setting item by the display processing unit based on the setting value information of the machine acquired from the plurality of information processing apparatuses.

3. The maintenance method for an information processing apparatus according to claim 1, wherein
the machine information of the information processing apparatus is analyzed for each machine by the display processing unit, and the setting value image is generated for each machine and combined with the statistical image by the display processing unit.

4. The maintenance method for an information processing apparatus according to claim 1, wherein
the machine information of the information processing apparatus is analyzed for each setting item by the display processing unit, and the setting value image is generated for each of the machines and synchronously combined with the statistical image by the display processing unit.

5. The maintenance method for an information processing apparatus according to claim 1, wherein
the statistical image is generated by a server connected with the plurality of information processing apparatuses,
and the setting value image is combined on the statistical image acquired from the server for each setting item.

6. The maintenance method for an information processing apparatus according to claim 5, wherein
the statistical image is acquired by downloading from the server based on the pattern of the statistical image set for each setting item of the machine and a correspondence table of the pattern and the statistical image.

7. A maintenance apparatus for an information processing apparatus, comprising:

a machine information acquisition unit configured to acquire a machine identification information for identifying the machine of the information processing apparatus and a machine information includes a setting value information of a plurality of setting items of a machine and an error information of the machine from an external storage apparatus;

a database configured to store the acquired machine information in association with the machine identification information, and to store a setting value of each setting item and a maximum value and a minimum value of the setting value as the setting value information of the machine;

a statistical image acquisition unit configured to acquire a statistical image which is generated based on the setting value information of a plurality of information processing apparatuses;

a display processing unit configured to generate a setting value image determined by the setting value information of the machine based on the machine information stored in the database and combining the setting value image with the statistical image; and a display processing unit configured to display the combined image on a display unit.

8. The maintenance apparatus for an information processing apparatus according to claim 7, wherein the display processing unit analyzes the machine information of the information processing apparatus for each machine, generates the setting value image for each machine and combines the setting value image with the statistical image.

9. The maintenance apparatus for an information processing apparatus according to claim 7, wherein the display processing unit analyzes the machine information of the information processing apparatus for each setting item, and generates the setting value image for each machine and synchronously combines the setting value image with the statistical image.

* * * * *

UNITED STATES PATENT AND TRADEMARK OFFICE
CERTIFICATE OF CORRECTION

PATENT NO.        : 8,994,969 B2
APPLICATION NO.   : 13/719931
DATED             : March 31, 2015
INVENTOR(S)       : Sou Miyazaki et al.

It is certified that error appears in the above-identified patent and that said Letters Patent is hereby corrected as shown below:

Title Page

(71) Applicants: Sou Miyazaki, Tokyo-to (KP), Reiji Murakami, Kanagawa-ken (JP), Yoshikatsu Kamisuwa, Tokyo-to (JP), Masaki Narahashi, Toshio-to (JP)

It should read:

(71) Applicants: KABUSHIKI KAISHA TOSHIBA, Tokyo, Japan, TOSHIBA TEC KABUSHIKI KAISHA, Tokyo, Japan

(72) Inventors: Sou Miyazaki, Tokyo-to (KP), Reiji Murakami, Kanagawa-ken (JP), Yoshikatsu Kamisuwa, Tokyo-to (JP), Masaki Narahashi, Toshio-to (JP)

It should read:

(72) Inventors: Sou Miyazaki, Tokyo-to (JP), Reiji Murakami, Kanagawa-ken (JP), Yoshikatsu Kamisuwa, Tokyo-to (JP), Masaki Narahashi, Toshio-to (JP)

Signed and Sealed this
Fourth Day of August, 2015

Michelle K. Lee
*Director of the United States Patent and Trademark Office*